(12) United States Patent
Brent, Jr.

(10) Patent No.: US 11,590,693 B2
(45) Date of Patent: Feb. 28, 2023

(54) METHODS OF MAKING A DEFLECTION MEMBER

(71) Applicant: The Procter & Gamble Company, Cincinnati, OH (US)

(72) Inventor: John Leslie Brent, Jr., Springboro, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 98 days.

(21) Appl. No.: 16/887,216

(22) Filed: May 29, 2020

(65) Prior Publication Data

US 2020/0376748 A1 Dec. 3, 2020

Related U.S. Application Data

(63) Continuation of application No. 62/855,237, filed on May 31, 2019.

(51) Int. Cl.
*B29C 64/124* (2017.01)
*B33Y 10/00* (2015.01)
(Continued)

(52) U.S. Cl.
CPC .......... *B29C 64/124* (2017.08); *B29C 64/129* (2017.08); *B29C 64/277* (2017.08); *B29C 64/321* (2017.08); *B33Y 10/00* (2014.12); *B33Y 70/10* (2020.01); *B33Y 80/00* (2014.12); *D21F 1/009* (2013.01); *B29K 2105/0002* (2013.01);
(Continued)

(58) Field of Classification Search
CPC ... B29C 64/124; B29C 64/129; B29C 64/135; B29C 64/245; B29C 64/40; B33Y 10/00; B33Y 30/00; B33Y 80/00; D21H 27/002; B29K 2105/0002; B29K 2105/0845; B29L 2031/4878; B29L 2031/7406
See application file for complete search history.

(56) References Cited

U.S. PATENT DOCUMENTS 4,528,239 A 7/1985 Trokhan
2017/0210077 A1* 7/2017 Ermoshkin ............ B33Y 50/02
(Continued)

FOREIGN PATENT DOCUMENTS

WO 2016179078 A1 11/2016

OTHER PUBLICATIONS

International Search Report and Written Opinion; Application Ser. No. PCT/US2020/070086; dated Oct. 19, 2020, 12 pages.
(Continued)

*Primary Examiner* — Joseph S Del Sole
*Assistant Examiner* — Jamel M Nelson
(74) *Attorney, Agent, or Firm* — Richard L. Alexander; Andrew J. Mueller

(57) ABSTRACT

A method for manufacturing a deflection member is disclosed. The method may include the steps of providing an additive manufacturing apparatus that includes at least one radiation source and a vat containing a photopolymer resin, providing a reinforcing member, contacting a surface of the reinforcing member with the photopolymer resin, and directing radiation from the at least one radiation source towards a surface of the reinforcing member to at least partially cure photopolymer resin in contact with the surface of the reinforcing member to create at least a portion of a lock-on layer.

9 Claims, 12 Drawing Sheets

(51) Int. Cl.
  *B33Y 80/00*   (2015.01)
  *B29C 64/321*  (2017.01)
  *B29C 64/277*  (2017.01)
  *B29C 64/129*  (2017.01)
  *B33Y 70/10*   (2020.01)
  *D21F 1/00*    (2006.01)
  *B33Y 30/00*   (2015.01)
  *B29K 105/08*  (2006.01)
  *B29L 31/48*   (2006.01)
  *B29L 31/00*   (2006.01)
  *B29K 105/00*  (2006.01)
  *D21F 11/00*   (2006.01)

(52) U.S. Cl.
  CPC .............. *B29K 2105/0845* (2013.01); *B29L 2031/4878* (2013.01); *B29L 2031/7406* (2013.01); *B33Y 30/00* (2014.12); *D21F 11/006* (2013.01)

(56) References Cited

U.S. PATENT DOCUMENTS

| | | |
|---|---|---|
| 2018/0119350 A1 | 5/2018 | Brent, Jr. et al. |
| 2018/0119354 A1* | 5/2018 | Brent, Jr. ................ B32B 3/30 |
| 2018/0333913 A1 | 11/2018 | Lin et al. |
| 2019/0134888 A1 | 5/2019 | Desimone et al. |
| 2020/0188187 A1 | 6/2020 | Blomström et al. |
| 2020/0378067 A1 | 12/2020 | Brent, Jr. et al. |

OTHER PUBLICATIONS

All Office Actions; U.S. Appl. No. 16/887,229, filed May 29, 2020.
All Office Actions; U.S. Appl. No. 18/050,480, filed Oct. 28, 2022.
Unpublished U.S. Appl. No. 18/050,480, filed Oct. 28, 2020 to John Leslie Brent.

\* cited by examiner

METHODS OF MAKING A DEFLECTION MEMBER

CROSS REFERENCE TO RELATED APPLICATION

This application claims the benefit of U.S. Provisional Application No. 62/855,237, filed May 31, 2019, the substance of which is incorporated herein by reference.

FIELD OF THE DISCLOSURE

The present disclosure is related to deflection members utilized for making soft, strong, textured and/or structured fibrous webs, such as, for example, paper products (e.g., toilet tissue and paper towels) and non-wovens (e.g., diaper top sheets). More particularly, this disclosure is directed towards methods to manufacture the deflection members used to produce such fibrous webs.

BACKGROUND OF THE INVENTION

Products made from textured and/or structured fibrous webs are used for a variety of purposes. For example, paper towels; facial tissues; toilet tissues; napkins; diaper, adult incontinence product and feminine care product topsheets and outer covers; and the like are in constant use in modern industrialized societies. The large demand for such paper and nonwoven products has created a further demand for improved versions. If such products are to perform their intended tasks and find wide acceptance, the improved versions must possess certain physical characteristics that are provided in part by new and improved fabrics/structured belts utilized in the particular papermaking process (e.g., conventional dry crepe, through air drying—i.e., "TAD", and hybrid technologies such as Metso's NTT, Georgia Pacific's ETAD, or Voith's ATMOS process) or in the particular non-woven making process (e.g., vacuum assisted spunbond fiber laydown).

As a nonlimiting example, traditional papermaking belts utilized in TAD papermaking processes have been described in commonly assigned U.S. Pat. No. 4,528,239, issued Jul. 9, 1985 to Trokhan. Trokhan teaches a belt in which a resinous framework is joined to a fluid-permeable reinforcing member such as a woven structure, or a felt. The resinous framework may be continuous, semi-continuous, comprise a plurality of discrete protuberances, or any combination thereof. The resinous framework extends outwardly from the reinforcing member to form a web-side of the belt (i.e., the surface upon which the web is disposed during a papermaking process), a backside opposite to the web-side, and deflection conduits extending there between. The deflection conduits provide spaces into which papermaking fibers deflect under application of a pressure differential during a papermaking process. Because of this quality, such papermaking belts are also known in the art as "deflection members." Such traditional deflection members may also be utilized in nonwoven making processes, where an applied pressure differential draws fibers into the deflection conduits.

The traditional deflection members taught by Trokhan are conventionally made in a process as described in commonly assigned U.S. Pat. No. 4,514,345 issued to Johnson et al. Johnson et al. teach placing a foraminous woven reinforcing member, such as a screen of woven polyester filaments, on a backing film and then supplying a single layer of liquid photosensitive resin over reinforcing member. A patterned mask is then placed over the photosensitive resin and portions of the resin are exposed through the mask to light of an activating wavelength to cure the resin in a pattern. The backing film is removed, and the uncured resin (hidden from light by the mask) is washed away from the composite leaving a deflection member.

Many improvements to the deflection members of Trokhan and the process of Johnson et al. have been made over the years, including various patterns imparted to the resinous framework (e.g., commonly assigned U.S. Pat. No. 10,132,042 to Maladen et al.) and various new iterations to the method of manufacture (e.g., commonly assigned U.S. Pat. No. 6,660,129 to Cabell et al.) Another relatively recent deflection member improvement is disclosed in commonly assigned U.S. patent application Ser. No. 15/132,291, filed Apr. 19, 2016 in the name of Manifold et al., teaching deflection members made via additive manufacturing, such as 3-D printing, to be utilized in making fibrous structures with increased surface area. Manifold et al. teach a unitary approach to manufacturing the deflection member's resinous framework and reinforcing member (i.e., the deflection member does not constitute a unit comprised of previously separate components joined together).

Although Manifold et al.'s deflection member manufacturing improvement allows for new and improved resinous framework patterns, there are concerns with deflection member durability because of the lack of a separate reinforcing member (e.g., a screen formed of strong polyester woven filaments) that largely contributes to the traditional deflection member's strength and longevity. Papermaking processes can require a deflection member to endure extreme temperatures, tensions, and pressures in a cyclic process. Nonwoven making processes can also require exposure to elevated temperatures, tensions and pressures in a cyclic process. Further, as papermaking and nonwoven processes continually increase speed to maximize machine output, such elevated/extreme temperatures, tensions and pressures also continually increase.

Accordingly, there is a continuing need for deflection members that can have any three-dimensional topography afforded by additive manufacturing on which fibrous webs can be formed, which also include a traditional separate reinforcing member to endure the evolving processing environment of a fibrous web making machine.

Additionally, there is a continuing need for methods for making deflection members that can have any three-dimensional topography afforded by additive manufacturing on which fibrous webs can be formed, which also include employing a traditional separate reinforcing member to endure the evolving processing environment of a fibrous web making machine.

SUMMARY OF THE INVENTION

In one aspect, a method for manufacturing a deflection member includes the steps of: providing an additive manufacturing apparatus that includes at least one radiation source and a vat containing a photopolymer resin; providing a reinforcing member having a first surface and a second surface opposite the first surface; contacting at least the second surface of the reinforcing member with the photopolymer resin; and directing radiation from the at least one radiation source towards the first surface of the reinforcing member such that the radiation passes through the first surface of the reinforcing member to at least partially cure photopolymer resin in contact with the second surface of the reinforcing member to create at least a portion of a lock-on layer.

In another aspect, a method for manufacturing a deflection member includes the steps of: providing an additive manufacturing apparatus that includes at least one upper radiation source, at least one lower radiation source, and a vat containing a photopolymer resin; providing a reinforcing member having an upper surface and a lower surface opposite the upper surface; submerging the reinforcing member into the photopolymer resin such that the upper surface of the reinforcing member faces the at least one upper radiation source and the lower surface of the reinforcing member faces the at least one lower radiation source; directing radiation from the at least one lower radiation source towards the lower surface of the reinforcing member to cure photopolymer resin in contact with the lower surface of the reinforcing member to create at least a portion of a lock-on layer; and optionally, directing radiation from the at least one upper radiation source towards the upper surface of the reinforcing member to cure photopolymer resin in contact with the upper surface of the reinforcing member to create at least a portion of a lock-on layer.

In yet another aspect, a method for manufacturing a deflection member includes the steps of: providing an additive manufacturing apparatus that includes at least one upper radiation source, at least one lower radiation source, and a vat containing a photopolymer resin; providing a reinforcing member having an upper surface and a lower surface opposite the upper surface; submerging the reinforcing member into the photopolymer resin such that the upper surface of the reinforcing member faces the at least one upper radiation source and the lower surface of the reinforcing member faces the at least one lower radiation source; directing radiation from the at least one upper radiation source towards the upper surface of the reinforcing member to cure photopolymer resin in contact with the upper surface of the reinforcing member to create at least a portion of a lock-on layer; and optionally, directing radiation from the at least one lower radiation source towards the lower surface of the reinforcing member to cure photopolymer resin in contact with the lower surface of the reinforcing member to create at least a portion of a lock-on layer.

DETAILED DESCRIPTION OF THE INVENTION

Figure 1:
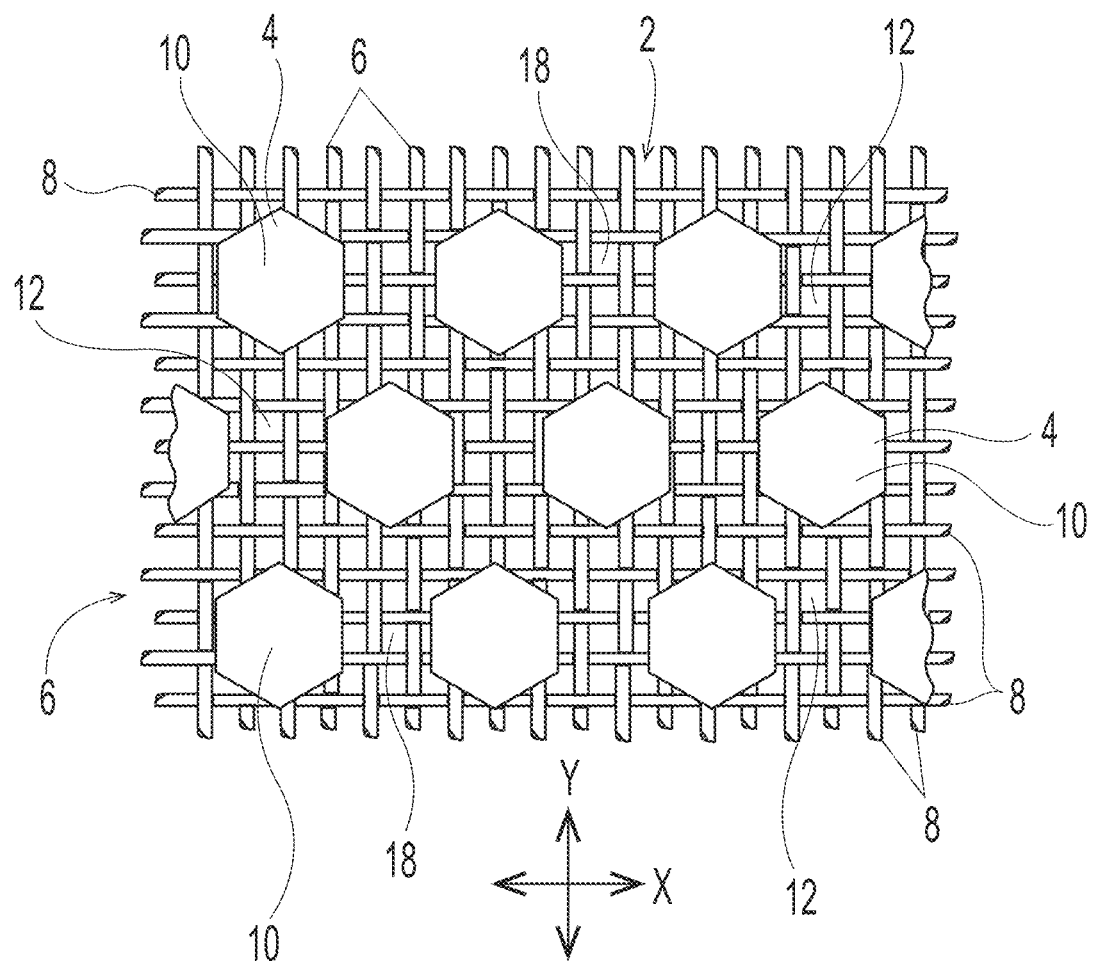
FIG. 1 is a representative deflection member.

Various non-limiting examples of the present disclosure will now be described to provide an overall understanding of the principles of the deflection members, and methods of manufacturing such deflection members, disclosed herein. One or more non-limiting examples are illustrated in the accompanying drawings. Those of ordinary skill in the art will understand that the deflection members, and methods of manufacturing such deflection members, described herein and illustrated in the accompanying drawings are non-limiting examples. The features illustrated or described in connection with one non-limiting example can be combined with the features of other non-limiting examples. Such modifications and variations are intended to be included within the scope of the present disclosure.

The present disclosure is directed to processes of using three dimensional printing technology to produce deflection members with a non-unitary reinforcing member that are intended for use in fibrous structure production (e.g., paper products and nonwovens). The process involves using computer control to print a framework of polymers of specific material properties onto, into and/or around a separately manufactured reinforcing member in an additive manner to create durable deflection members with a long lifespan and unique structural and topographical profiles. The terms "three dimensional printing technology", "three dimensional printing system," "three dimensional printer," "3-D printing", "printing," "additive manufacturing", "additive manufacturing apparatus", "AM" and the like all generally describe various solid freeform fabrication techniques for using a build material or a print material to make three dimensional (3-D) objects by stereolithography (SLA), continuous liquid interface production (CLIP), selective deposition, jetting, fused deposition modeling (FDM, as marketed by Stratasys Corp., Eden Prairie, Minn.), also known as fused filament fabrication (FFF), bonded deposition modeling, selective laser melting (SLM), direct metal laser sintering (DMLS), selective laser sintering (SLS), laminated object manufacturing (LOM), and other techniques now known in the art, or that may be known in the future. Stereolithography may include the use of lasers, DLP projectors, DMD digital micro-mirror devices and/or combinations thereof. Digital masks may be used to control the distribution and localized control of radiation exposure either as from a source such as a display (e.g., LCD, LED) or displays that regulate the passage of curing radiation from a source.

Additive manufacturing is widely used in both research and industry, such as, for example, the automotive and aviation industries, for creating components that require a high level of precision. Traditional additive manufacturing processes involve the use of CAD (Computer Aided Design) software to generate a virtual 3-D model, which is then transferred to process preparation software where the model is virtually disassembled into individual slices or layers. The model is then sent to an additive manufacturing apparatus, where the actual object in printed layer by layer. As previously detailed in the Background, current methods for additively manufacturing deflection members are unitary in nature (i.e., the deflection member does not constitute a unit comprised of previously separate components joined together) and/or don't include methods of manufacture that provide for a strong bond (i.e., "lock-on") between the resinous framework and the reinforcing member. Accordingly, currently available additively manufactured deflection members do not have the strength or longevity to be economically utilized in current papermaking or nonwoven production processes.

Figure 2:
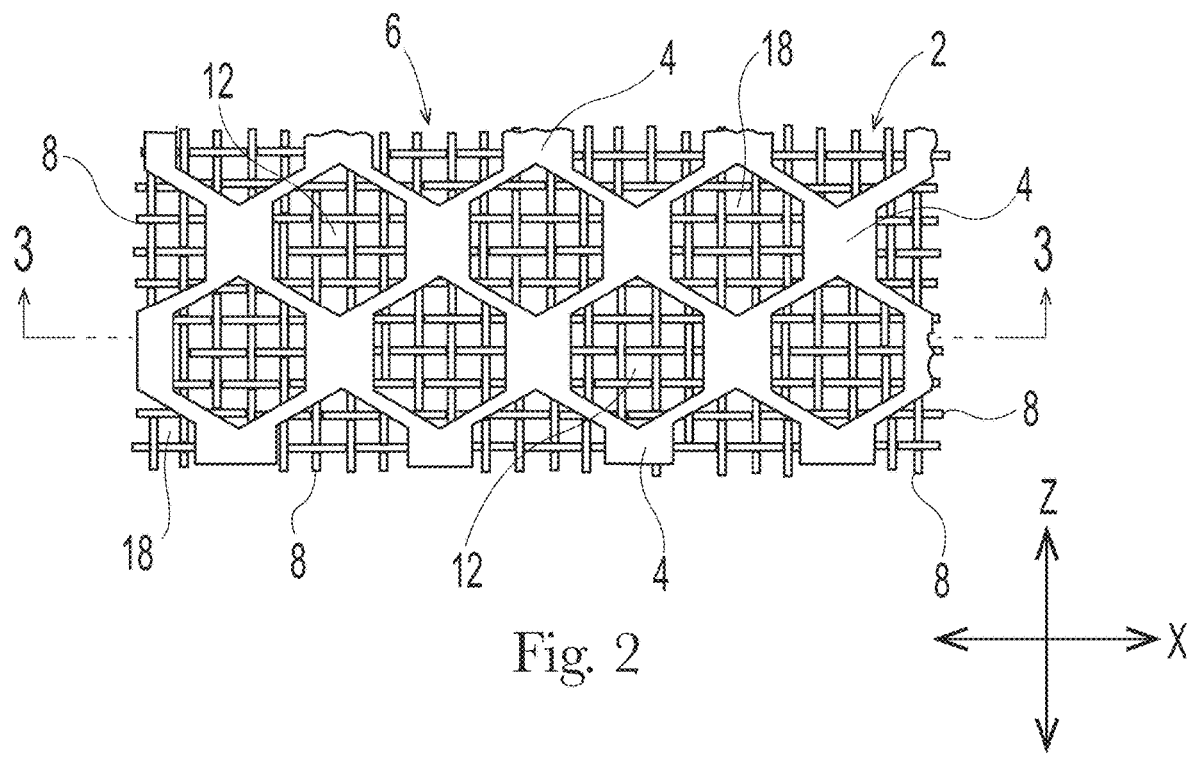
FIG. 2 is a representative deflection member.
Figure 3:
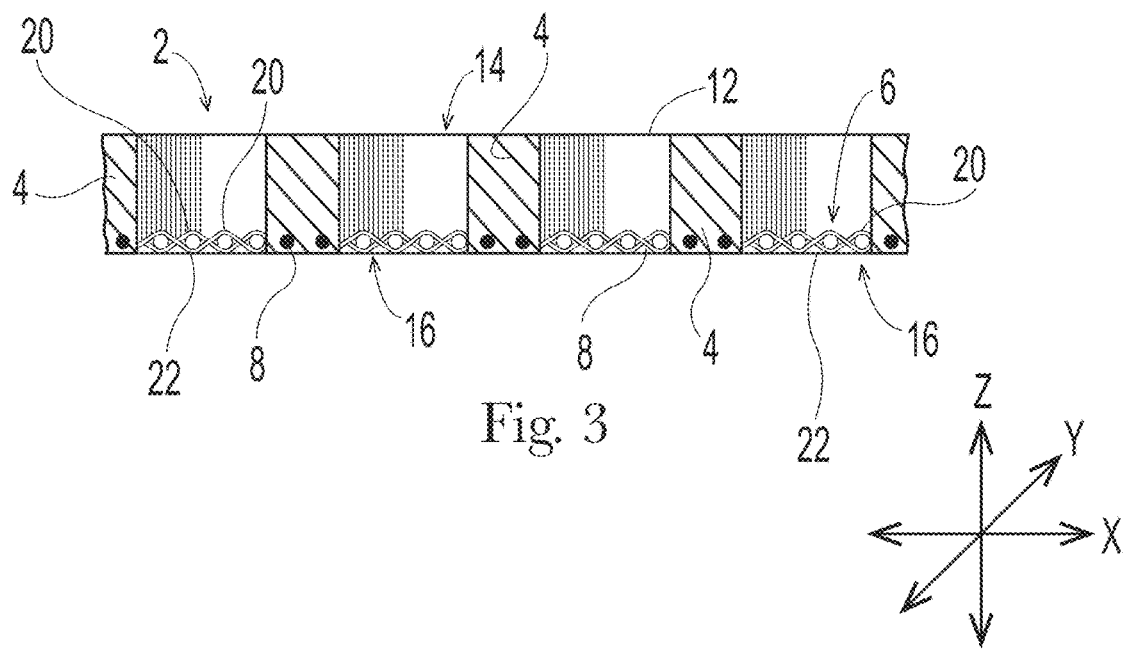
FIG. 3 is a cross-sectional view of the representative deflection member shown in FIG. 2, taken along line 3-3 of FIG. 2.

An example of a traditional deflection member of the general type useful in the present disclosure, but made according to the disclosure of U.S. Pat. No. 4,514,345, is shown in FIGS. 1-3. As illustrated, a deflection member 2 includes a resinous framework 4 attached to a permeable reinforcing member 6.

Resinous framework 4 may comprise cross-linkable polymers or alternatively composite materials that include cross-linkable polymers and filler materials. For example, in some forms detailed herein, the resinous framework 4 includes cross-linkable polymers selected from light activated polymers (e.g., UV light activated, e-beam activated, etc.), heat activated polymers, multipart polymers, moisture activated polymers, chemically activated polymers, and combinations thereof. In some deflection members, the utilized resinous framework may include any of the cross-linkable polymers as described in U.S. Pat. No. 4,514,345 issued Apr. 30, 1985 in the name of Johnson et al., and/or as described in U.S. Pat. No. 6,010,598 issued Jan. 4, 2000 in the name of Boutilier et al. In other deflection members, the utilized resinous framework may include any of the cross-linkable polymers as described in U.S. Pat. No. 7,445,831 issued Nov. 4, 2008 in the name of Ashraf et al. Other suitable cross-linkable and filler materials known in the art may also be used as resinous framework.

The pattern of resinous framework 4 can be structed in any decorative pattern known in the art of papermaking belts (micro patterns, i.e., the structure of an individual protuberance within the resinous framework and/or macro patterns, i.e., a pattern including multiple protuberances, or the overall deflection member belt pattern including many protuberances). In particular, patterns that are not able to be manufactured in traditional deflection member production processes, such as taught by Johnson et al., are of the most interest. For example, the resinous framework patterns taught by Manifold et al. in U.S. patent application Ser. No. 15/132,291 are of high interest.

Reinforcing member 6 can be made of woven filaments 8 as are known and are common in the art of papermaking belts. In such non-limiting forms, woven filaments can be made of natural fibers, cotton fibers, coated fibers, genetically engineered fibers, synthetic fibers, metallic fibers, carbon fibers, silicon carbide fibers, fiberglass, mineral fibers, and/or polymer fibers including polyethylene terephthalate ("PET") or PBT polyester, phenol-formaldehyde (PF); polyvinyl chloride fiber (PVC); polyolefins (PP and PE); acrylic polyesters; aromatic polyamides (aramids) such as Twaron®, Kevlar® and Nomex®; polytetrafluoroethylene such as Teflon® commercially available from DuPont®, polyethylene (PE), including with extremely long chains/HMPE (e.g. Dyneema or Spectra); polyphenylene sulfide ("PPS"); and/or elastomers. In one non-limiting form, the woven filaments of the reinforcing member are filaments as disclosed in U.S. Pat. No. 9,453,303 issued Sep. 27, 2016 in the name of Aberg et al.

The woven filaments may be translucent, partially translucent, or opaque to assist and/or deter curing of the resinous framework. The reinforcing member may include woven filaments that exhibit a diameter of about 0.20 mm to about 1.2 mm, or about 0.20 mm to about 0.55 mm, or about 0.35 mm to about 0.45 mm. The reinforcing member may be manufactured by traditional weaving processes, or may be manufactured through other processes such as additive manufacturing, e.g., 3-D printing—but in such embodiments, the reinforcing member is not made in a unitary manner with the resinous framework.

The reinforcing member may also be made of any other permeable material known in the art. The term "permeable" may be used to refer generally to a material or structure that allows a liquid state cross-linkable polymer being utilized to build the resinous framework of the deflection member to pass at least partially through or be at least partially absorbed. Such permeable materials can be a porous material such as textiles, fabrics, knits, woven materials, mesh, polymers, rubbers, foams, etc. The porous materials can be in the form of a flexible cloth, a sheet, a layer and other structures.

Whether formed or woven filaments, reinforcing members may be of an endless or seamless design. Optionally, the reinforcing member may be cut or from stock of finite or infinite length. Once made, the deflection member may need to be seamed, sewn, fastened or fixed as is common in the art of papermaking or non-woven manufacture.

Whether formed of woven filaments and/or other permeable materials, reinforcing member 6 may include voids (i.e., spaces naturally occurring in a woven product between filaments) and/or foramina (i.e., perforations formed in a previously non-perforated reinforcing member). Reinforcing member 6 may also be formed from impermeable or semi-impermeable materials known in the art, such as various plastics, metals, metal impregnated plastics, etc., that include voids and/or foramina. Whether permeable, impermeable, or semi-impermeable, the reinforcing member may be translucent, partially translucent, or opaque to assist and/or deter curing of the resinous framework.

The particular deflection member structure shown in FIG. 1 includes discrete cured resin elements 10 and a continuous deflection conduit 12 (i.e., the space between the cured resin elements that allows a pressure differential to flow through voids 18 in woven reinforcing member 6). The particular deflection member structure shown in FIG. 2 includes a resinous framework 4 that is structured in a continuous pattern with discrete deflection conduits 12 (i.e., the space surrounded by the continuous cured resin element that allows a pressure differential to flow through voids 18 in woven reinforcing member 6). In non-illustrated embodiments, the resinous framework can also be structured to be a semi-continuous pattern on reinforcing member 6. The illustrated patterns include a resinous framework that includes either discrete cured resin elements or deflection conduits in a hexagon shape when viewed from above or below. The deflection members created by the additive manufacturing processes detailed herein may have an identical or similar resinous framework structure. However, the deflection members created by the additive manufacturing processes detailed herein may have a resinous framework that may have any shape or structure known in the art of papermaking and nonwoven making belts.

Figure 4:
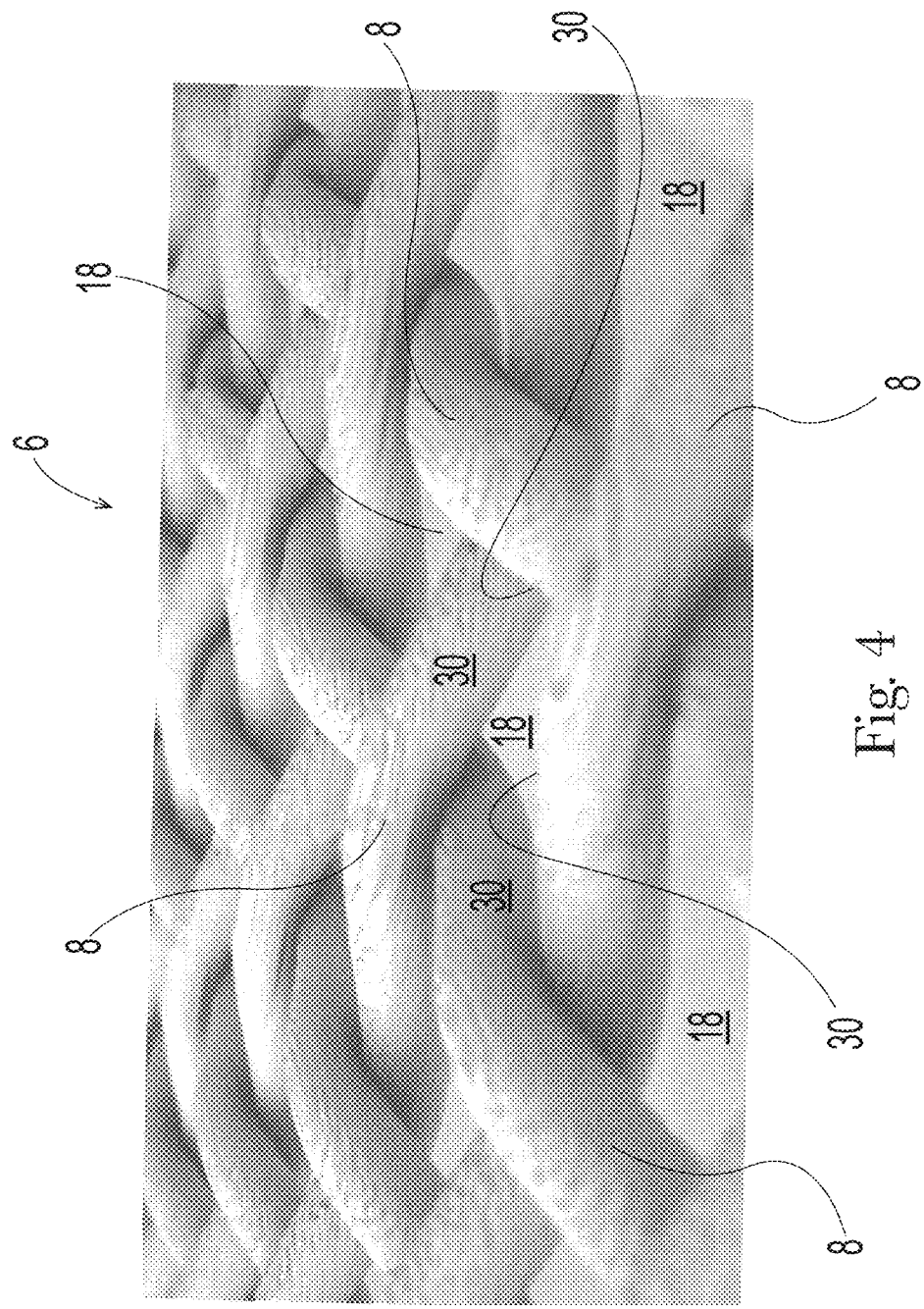
FIG. 4 is a close up view of the filaments in a representative woven reinforcing member.

FIG. 4 illustrates a close up of a nonlimiting embodiment of a woven reinforcing member 6. Filaments 8 are woven together to form voids 18 between the filaments. As can be observed, each void 18 is framed by four surrounding filaments 8. Accordingly, in the non-limiting illustrated embodiment, each void has four side surfaces 30, with each side surface being formed by the portion of the filament that faces inward towards the void. In other non-illustrated embodiments, the woven filaments may be woven in a different pattern, and thus, voids 18 may have more than four side surfaces, or as few as three or substantially two side surfaces.

In other non-illustrated embodiments, the reinforcing member can be a material that is not a woven reinforcing member (e.g., a permeable or non-permeable material as detailed above). Such material may be a sheet or film and may be translucent, partially translucent, or opaque to assist and/or deter curing of the resinous framework. Such reinforcing member may include foramina. The foramina will function like the voids in a woven reinforcing member by also allowing a pressure differential to flow through the deflection conduits during the papermaking and/or nonwoven making processes. The voids/foramina provide an open area in the reinforcing member sufficient to allow water and/or air to pass through during papermaking and nonwoven making processes, but nevertheless preventing fibers from being drawn through. As fibers are molded into the deflection member during production of fibrous substrates, the reinforcing member serves as a "backstop" to prevent or minimize fiber loss through the deflection member.

Figure 5:
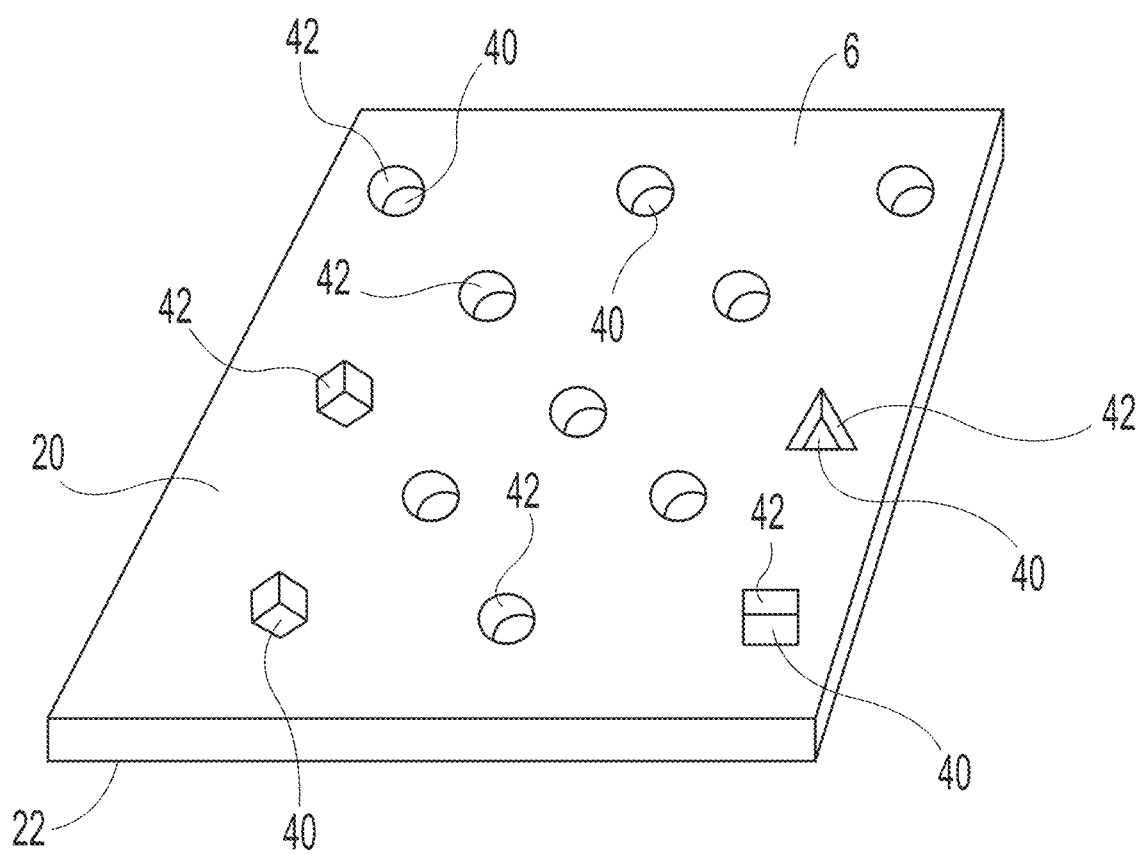
FIG. 5 is a schematic representation of a reinforcing member.

FIG. 5 illustrates a close up of a nonlimiting embodiment of a reinforcing member 6 that is not a woven reinforcing member and includes foramina 40. Foramina 40 may be included in reinforcing member 6 in any number and/or size and/or regular or irregular shape (e.g., circles, ovals, triangles, squares, hexagons, octagons, etc.) and/or pattern. Foramina 40 each include at least one sidewall surface 42. The side wall surface(s) 42 is/are the surface(s) that extend between the substantially planar upper surface 20 and the substantially planar lower surface 22 of reinforcing member 6. For example, in foramina 40 that are of a circular or oval shape when viewed from above, there is a single continuous sidewall surface 42. In foramina that are square in shape when viewed from above, there are four sidewall surfaces 42.

FIG. 3 is a cross-sectional view of FIG. 2 taken along line 3-3. As illustrated, overall deflection member 2, as well as resinous framework 4, have a substantially planar upper surface 14 and a substantially planar lower surface 16. In non-illustrated embodiments, the deflection member and the resinous framework may have an upper surface and a lower surface that are not substantially planar. In such embodiments, the upper surface is considered to be an X-Y plane, wherein X and Y can correspond generally to the cross-direction (CD) and the machine direction (MD) respectively, that intersects the portion of the resinous framework that is the furthest distance above the reinforcing member in the Z direction. In the same embodiment, the lower surface is considered to be an X-Y plane that intersects the portion of the resinous framework that is the furthest distance below the reinforcing member in the Z direction.

One skilled in the art will appreciate that the symbols "X," "Y," and "Z" designate a system of Cartesian coordinates, wherein mutually perpendicular "X" and "Y" define a reference plane formed by a flat, level surface upon which lower surface 16 of deflection member 2 sits, and "Z" defines a direction orthogonal to the X-Y plane. Accordingly, the term "X-Y plane" used herein refers to a plane that is parallel to the reference plane formed by the flat, level surface upon which lower surface 16 of deflection member 2 sits. The person skilled in the art will also appreciate that the use of the term "plane" does not require absolute flatness or smoothness of any portion or feature described as planar. In fact, the lower surface 16 of deflection member 2 can have texture, including so-called "backside texture" which is helpful when the deflection member is used as a papermaking belt on vacuum rolls in a papermaking process as described in Trokhan or Cabell et al. As used herein, the term "Z direction" designates any direction perpendicular to the X-Y plane. Analogously, the term "Z dimension" means a dimension, distance, or parameter measured parallel to the Z-direction and can be used to refer to dimensions such as the height of protuberances or the thickness, or caliper, of the unitary deflection member. It should be carefully noted, however, that an element that "extends" in the Z-direction does not need itself to be oriented strictly parallel to the Z-direction; the term "extends in the Z direction" in this context merely indicates that the element extends in a direction which is not parallel to the X-Y plane. Analogously, an element that "extends in a direction parallel to the X-Y plane" does not need, as a whole, to be parallel to the X-Y plane; such an element can be oriented in the direction that is not parallel to the Z direction.

When viewed in cross-section, the illustrated deflection members include a resinous framework that includes either discrete cured resin elements or discrete deflection conduits with substantially planar upper and lower surfaces in common with the substantially planar upper and lower surfaces of the deflection member. Further, the wall surfaces that span the distance between the upper and lower surfaces of the resinous framework are substantially flat and perpendicular to both the upper and lower surfaces. The deflection members created by the additive manufacturing processes detailed herein may have an identical or similar resinous framework structure. However, the deflection members created by the additive manufacturing processes detailed herein may have a resinous framework that can have any shape or structure known in the art of papermaking and nonwoven making belts. For example, the wall surfaces can be straight or curved, perpendicular or angled to the upper and lower surfaces, and the upper and lower surfaces can be flat, textured, patterned, consistent, irregular, stepped, cantilevered, overhanging, porous and/or angled.

Further, as illustrated in FIG. 3, reinforcing member 6 may have a substantially planar upper surface 20 and a substantially planar lower surface 22. In embodiments that have a woven reinforcing member, such reinforcing member may have macroscopically substantially planar upper and lower surfaces, while also having a microscopically non-substantially planar upper and lower surfaces. As used herein, the terms containing "macroscopical" or "macroscopically" refer to an overall geometry of a structure under consideration when it is placed in a two-dimensional configuration. In contrast, "microscopical" or "microscopically" refer to relatively small details of the structure under consideration, without regard to its overall geometry. For example, in the context of the reinforcing member, the term "macroscopically substantially planar" means that the reinforcing member, when it is placed in a two-dimensional configuration, has—as a whole—only minor deviations from absolute planarity, and the deviations do not adversely affect the reinforcing member's performance. At the same time, the reinforcing member can have a microscopical non-substantially planar upper and lower surfaces due to the three-dimensional pattern of woven filaments, as illustrated herein in FIGS. 1-3.

In embodiments of deflection member that include a woven reinforcing member, upper surface 20 of reinforcing member 6 is considered to be an X-Y plane (i.e., a plane that is parallel to a reference plane formed by the flat, level surface upon which lower surface 16 of deflection member 2 sits) that intersects with the portion of the reinforcing member that is the furthest distance in the Z direction above lower surface 16 of deflection member 2. Lower surface 22 of reinforcing member 6 is considered to be an X-Y plane that intersects the portion of the reinforcing member that is the furthest distance in the Z direction below upper surface 14 of deflection member 2.

Process for Making Deflection Members

The additive manufacturing processes detailed below may be used to produce deflection members of the general type (including specific deflection members disclosed in the incorporated references) detailed above that include a resinous framework and a non-unitary reinforcing member. The types of additive manufacturing apparatuses that are employable in the methods detailed here are any type now known in the art, or that may be known in the future. Two interesting, but non-limiting, examples of applicable additive manufacturing apparatuses include SLA and CLIP, as are currently known in the art of additive manufacturing. Regardless of the particular type of additive manufacturing apparatus employed, the apparatus may include at least one radiation source and a vat containing a photopolymer resin.

The at least one radiation source may include one, two, three, four, five, six, seven, eight, nine, ten, or more individual radiation sources. The at least one radiation source may include between 1 and about 50 individual radiation sources, between 1 and about 20 individual radiation sources, or between 1 and about 15 individual radiation sources, or between 1 and about 10 individual radiation sources, or between 1 and about 5 individual radiation sources, or between 1 and about 3 individual radiation sources. In some embodiments detailed below, such as methods for continually printing deflection members, the at least one radiation source may include 50 or more individual radiation sources, or between about 50 and about 50,000 individual radiation sources, or between about 50 and about 900 individual radiation sources, or between about 50 and about 220 individual radiation sources, or between about 50 and about 100 individual radiation sources, or between about 50 and about 75 individual radiation sources. These radiation sources may be oriented in the cross-direction (CD) and/or machine direction (MD) at one or more locations along the length of a deflection member. The at least one radiation source may include one or more individual radiation sources located at an upper location on the additive manufacturing apparatus (i.e., upper radiation source(s)) and/or include one or more individual radiation sources located at a lower location on the additive manufacturing apparatus (i.e., lower radiation source(s)). The radiation may be directed orthogonally towards the surface of the deflection member and/or reinforcing member, or may be angled towards, or may be reflected towards the surface of the deflection member and/or reinforcing member (i.e., directed in a non-orthogonal manner).

The at least one radiation source emits radiation that is utilized in the curing of the photopolymer resin. The at least one radiation source can generate actinic radiation from an ultraviolet (UV) laser, a visible (VIS) laser, an infrared (IR) laser, a DLP projector, an LED array or display, an LCD panel or display, fiber optic bundles or assemblies thereof, or any other radiation type now known in the art, or that may be known in the future. In additive manufacturing apparatuses that include multiple radiation sources, the radiation sources may be all be of the same type, wavelength, and/or output strength, or the radiation sources may be any combination of types, wavelength, and/or output strengths. A non-limiting example of a UV laser can be constructed starting with a laser diode, such as a 375 nm (70 mW maximum power) available from ThorLabs (part number L375P70MLD) or less expensive VIS lasers operating at 405 nm (available in 20 mW to 1 W maximum power, L405P20 and L405G1 respectively from ThorLabs). Other non-limiting examples may include argon-ion lasers which can, depending on the type, emit at a variety of wavelengths in UV, VIS and IR: 351.1 nm, 363.8 nm, 454.6 nm, 457.9 nm, 465.8 nm, 476.5 nm, 488.0 nm, 496.5 nm, 501.7 nm, 514.5 nm, 528.7 nm, 1092.3 nm. Commercial examples of applicable 405 nm lasers include the Form series of SLA printers available from FormLabs such as the Form 1+ and Form 2 (250 mW maximum power with a 140 micron spot size). Still another example of a laser applicable to the methods detailed herein is a VIS laser (532 nm, maximum 6 W), as detailed by M. Shusteff et al. in U.S. Patent Publication No. 2018/001567, taught to be effective at volumetric curing of resin via multiple orthogonal beams when interested in shapes from intersecting extruded profiles. Energy is provided and/or controlled in sufficient quantity to promote curing and thereby exceeding thresholds provided by dissolved oxygen or other inhibitors such as those consistent with the publications: Continuous AM by Volumetric Polymerization Inhibition Patterning, Jan. 11, 2019 by M. P. de Beer; *Science Adv.* 5:*eaau*8723+*Supplementary Materials*; and U.S. Patent Publication Nos. 2019/0134888 and 2019/0126534 to DeSimone et al. and WO2014/126837 to DeSimone et al. and U.S. Patent Publication No. 2017/0120515 to J. P. Rolland et al.

The vat containing photopolymer resin may be of any size to accommodate the printing of deflection members. The vat may be clear, translucent, or opaque, and constructed of plastic, stainless steel or any other material known in the art that is deep enough to hold the required amount of photopolymer resin. The vat may be lined with a minimally or non-reflective surface such black Formica. The volume of resin in the vat is controlled to incrementally or wholly deliver the final thickness in the finished deflection member. Multiple vats may be used or the resin in the vat may be replaced to deliver different material properties or control depth of cure due to resin absorption properties at the radiation wavelength.

As detailed above, the photopolymer resin(s) applicable for the additive manufacturing methods detailed herein may include cross-linkable polymers selected from light activated polymers (e.g., UV light activated, e-beam activated, etc.) now known in the art, or that may be known in the future. The photopolymer resin may include any of the cross-linkable polymers as described in U.S. Pat. No. 4,514,345 issued Apr. 30, 1985 in the name of Johnson et al., and/or as described in U.S. Pat. No. 6,010,598 issued Jan. 4, 2000 in the name of Boutilier et al. In addition, the photopolymer resin may include any of the cross-linkable polymers as described in U.S. Pat. No. 7,445,831 issued Nov. 4, 2008 in the name of Ashraf et al. Other suitable cross-linkable and filler materials known in the art may also be employed as the photopolymer resin. The reinforcing members applicable for the additive manufacturing methods detailed herein may be any of the reinforcing members detailed herein.

First Method:

In one method for manufacturing a deflection member, an additive manufacturing apparatus 100 is provided that includes at least one radiation source 130 and a vat 140 containing photopolymer resin 150. A reinforcing member 106 is provided that has a first surface 120 and a second surface 122 opposite the first surface. Second surface 122 of reinforcing member 106 is contacted with photopolymer resin 150 contained in vat 140. In some embodiments, such contact may be only slight contact between second surface 122 of reinforcing member 106 and photopolymer resin 150 contained within vat 140. In other embodiments, the contact may be a result of the entire reinforcing member being submerged within photopolymer resin 150 contained in vat 140. In other embodiments, the contact between second surface 122 of reinforcing member 106 and photopolymer resin 150 may be of an amount in between these two extremes, for example, reinforcing member 106 may be a quarter, or half, or three-quarters submerged within photopolymer resin 150.

Figure 6:
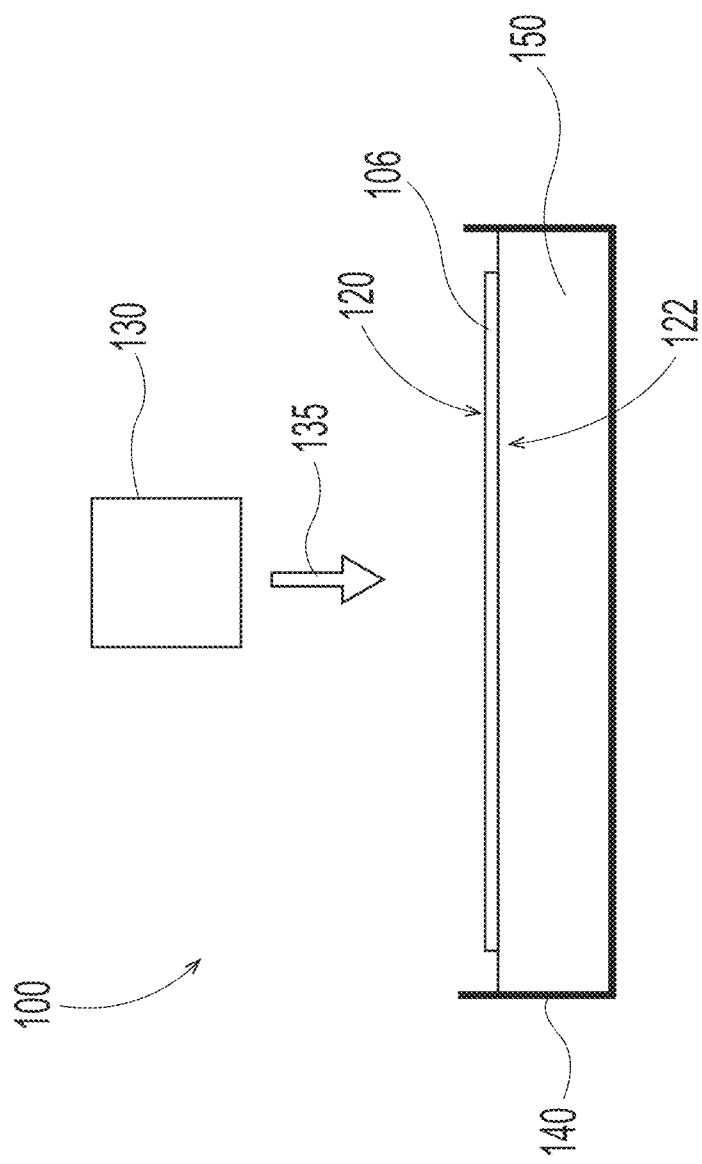
FIG. 6 is a schematic representation of system set up to employ in the additive methods as detailed herein.
Figure 7:
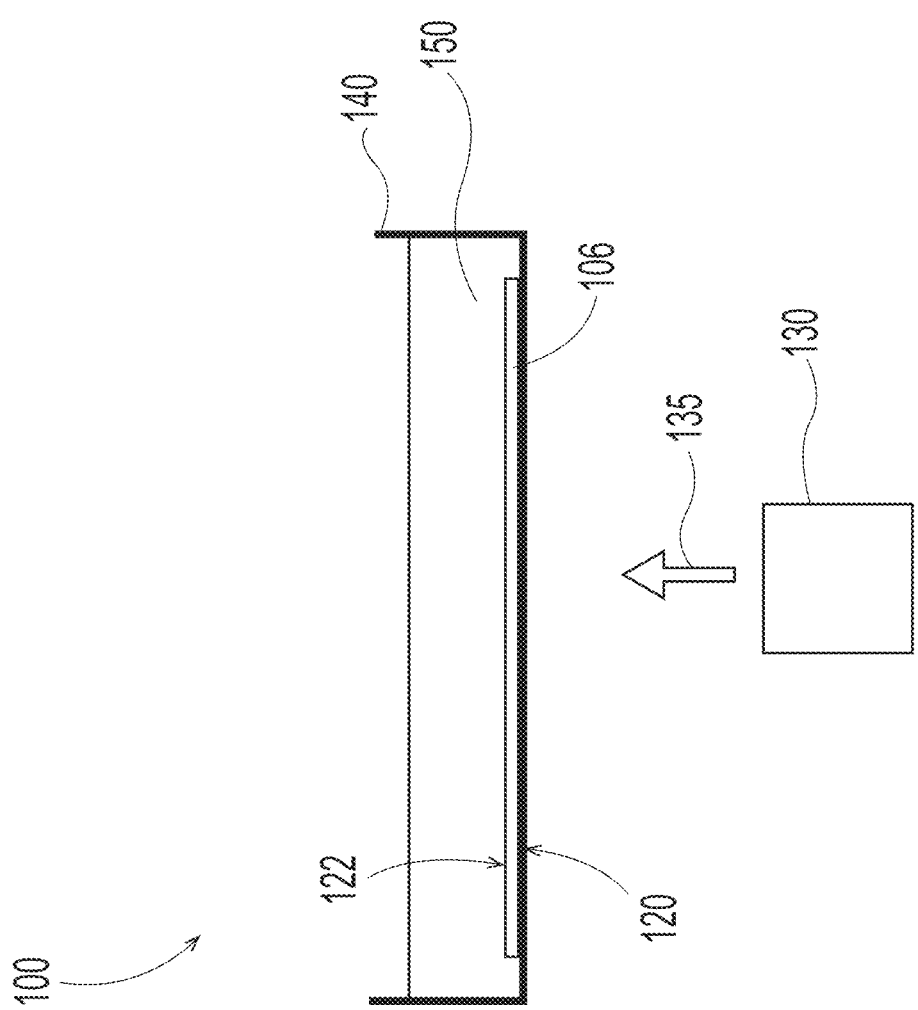
FIG. 7 is a schematic representation of system set up to employ in the additive methods as detailed herein.

Once contact is made between reinforcing member 106 and the photopolymer resin 150, a setup as illustrated in the exemplary embodiments of FIG. 6 or 7 is achieved. FIG. 6 illustrates an embodiment where at least one radiation source 130 is located above vat 140 containing photopolymer resin 150 and the contact between second surface 122 of reinforcing member 106 and the photopolymer resin contained in the vat is only between the second surface and the photopolymer resin. FIG. 7 illustrates an embodiment where at least one radiation source 130 is located below vat 140 containing photopolymer resin 150 and the contact between second surface 122 of reinforcing member 106 and the photopolymer resin contained in the vat is the result of the entire reinforcing member being submerged in the photopolymer resin. In either exemplary embodiment, the utilized reinforcing member may be translucent so that radiation may pass through the reinforcing member.

Radiation 135 may then be created by at least one radiation source 130 and directed from the at least one radiation source towards first surface 120 of reinforcing member 106 such that the radiation passes through the first surface of the reinforcing member to at least partially cure photopolymer resin in contact with second surface 122 of the reinforcing member to create at least a portion of a lock-on layer (not shown). In some embodiments, radiation 135 is enough to create the entire lock-on layer. The term "lock-on layer" is used to describe the layer of at least partially cured photopolymer resin that surrounds the reinforcing member. Lock-on layer may include the at least partially cured resin that surrounds first surface 120, second surface 122, the sidewall surfaces 42 of any foramina 40 (as detailed in FIG. 5), the side surfaces 30 of any voids 18 of reinforcing member 106 (as detailed in FIGS. 1-4), and or any other surface of the reinforcing member, such as the outers edges of the overall member. The radiation may be assisted to cure the photopolymer resin in contact with the second surface through any means known in the art, including, but not limited to, radiation strength or intensity, opaque photopolymer resin, and/or a build plate adjacent to or in contact with the second surface of the reinforcing member that stops/reflects the radiation once it travels through the reinforcing member.

Once the first portion of the lock-on layer is cured, in the embodiment illustrated in FIG. 6, reinforcing member 106 can be submerged into photopolymer resin 150. Reinforcing member 106 movement can be carried out through utilization of a build plate (not shown) or a tensioned reinforcing member (i.e., between rollers not shown) moving by manual or computer control, or any other way known in the art of additive manufacturing. In the embodiment of FIG. 7, reinforcing layer 106 is already submerged in photopolymer resin 150, so the reinforcing layer may be backed away from the bottom of vat 140, allowing photopolymer resin to flow between the reinforcing layer and the bottom of the vat. In alternate embodiments, the upper surface of the photopolymer resin can be moved relative to the upper surface of the reinforcing member by adding an additional volume of resin, and optionally may accelerate leveling and bubble removal by mechanical (e.g., wiping, not shown) or thermal (e.g., pre-heating or heating the resin) means or combinations thereof. This reinforcing layer movement can be carried out through utilization of a build plate (not shown) or a tensioned reinforcing member (i.e., between rollers not shown), moving by manual or computer control, or any other way known in the art of additive manufacturing. Build plate may be made of any material known in the art that can assist in reflecting/stopping the utilized radiation, for example, an opaque film, stainless steel, brushed aluminum or other metals known in the art. In either embodiment, photopolymer resin 150 is now in contact with first surface 120. In alternate embodiments, a build plate could be a clear film or solid material such as glass, quartz or polymer to enable transmission of radiation or polymer to allow diffusion of gas such as oxygen.

Radiation 135 may then be created by at least one radiation source 130 and directed from the at least one radiation source towards first surface 120 of reinforcing member 106 such that the radiation at least partially cures photopolymer resin in contact with the first surface of the reinforcing member to create at least a portion of a lock-on layer (not shown). In some embodiments, this portion of the lock-on layer in addition to the previously described portion of the lock-on layer (cured photopolymer resin in contact with second surface 122 of reinforcing member 106) will make up the entire lock-on layer.

In embodiments where reinforcing member 106 includes voids 18, radiation 135 may also be created by at least one radiation source 130 and directed from the at least one radiation source towards first surface 120 of the reinforcing member such that the radiation at least partially cures photopolymer resin in contact with at least one side surface 30 of at least some of the voids to create at least a portion of the lock-on layer (not shown). In some embodiments, this portion of the lock-on layer in addition to at least one of the previously described portions of the lock-on layer (cured photopolymer resin in contact with the first and/or second surfaces of the reinforcing member) will make up the entire lock-on layer. In some embodiments, radiation 135 may be repeated to create at least a portion of the lock-on layer or make-up the entire lock-on layer.

In embodiments where reinforcing member 106 includes foramina 40, radiation 135 may also be created by at least one radiation source 130 and directed from the at least one radiation source towards first surface 120 of the reinforcing member such that the radiation at least partially cures photopolymer resin in contact with at least one sidewall 42 of at least some of the foramina to create at least a portion of the lock-on layer (not shown). In some embodiments, this portion of the lock-on layer in addition to at least one of the previously described portions of the lock-on layer (cured photopolymer resin in contact with the first and/or second surfaces of the reinforcing member) will make up the entire lock-on layer. In some embodiments where reinforcing member 106 includes foramina 40, radiation 135 may be repeated to create at least a portion of the lock-on layer or make-up the entire lock-on layer.

After the lock-on layer is created through one or more of the steps described above, radiation 135 may be created by at least one radiation source 130 and directed towards first surface 120 of reinforcing member 106 to at least partially cure photopolymer in contact with the lock-on layer to create a build layer (not shown). In some embodiments, radiation 135 may be repeated with at least one radiation source 130 to create at least a portion of the build-up layer or make-up the entire build-up layer. An exemplary embodiment is that a portion of the lock-on layer and build layer can be created almost simultaneously or the entire lock-on layer and build layer can be created almost simultaneously. The term "build layer" is used to describe the layer(s) of at least partially cured photopolymer resin that is/are created upon the lock-on layer. The lock-on layer can be backed away from the bottom of vat 140, allowing photopolymer resin to flow between the lock-on layer and the bottom of the vat. In alternate embodiments of FIG. 6 and FIG. 7, the upper surface of the photopolymer resin can be moved relative to the upper surface of the reinforcing member by adding an additional volume of resin and optionally may accelerate leveling and bubble removal by mechanical (e.g. wiping, not shown) or thermal (e.g. pre-heating or heating the resin) means or combinations thereof.

The build layers stack on top of each other and create a structure that will resemble the resinous framework of traditional deflection members. As described above, the build layers created by additive manufacturing in the methods detailed herein that form the resinous framework equivalent of traditional deflection members may be in any shape, style or structure now known, or known in the future. The number of build layers that build on top of one another (with the bottom build layer contacting the lock-on layer) may be between 1 and about 500, or may be between 1 and about 300, or may be between 1 and about 200, or may be between 1 and about 150, or may be between 1 and about 100, or may be between 1 and about 75, or may be between 1 and about 50, or may be between 1 and about 25, or may be between 1 and about 50,000. When creating the build layer(s), the reinforcing member/lock-on layer is moved further from radiation source 130 with creation of each successive build layer. Alternatively, the radiation source may be moved further away from the reinforcing member/lock-on layer may with creation of each successive build layer. This reinforcing layer/lock-on layer movement can be carried out through utilization of a build plate (not shown) moving by manual or computer control, or any other way known in the art of additive manufacturing. Further, in embodiments where the radiation source moves or is reflected, the radiation source movement or reflection, or combination thereof, may be carried out through utilization of any means known in the art. Individual build layer thickness may represent incremental distance on the order of microns—examples include, but are not limited to, 1000, 100, 10, 1 and/or 0.1 microns.

While creating the lock-on layer and/or build layer(s), reinforcing member 106 may be tensioned to control warp while curing. Tension may occur in both planar and non-planar configurations. The build layers may be registered with the previous layer. Other shapes may be created by practicing one or more layers in an unregistered fashion relative to the previous layer. Registration is defined as positioning an X-Y region along a Z axis that is common to all layers within a shape—an example would be stacking layers to create a symmetrical shape. Other methods of stacking may require positioning that is off-center for a given X-Y region but registered with the previous layer to preserve continuity in one or more side walls. Lastly, it is possible that registered stacking is substantially symmetrical rather than perfectly symmetrical.

After the at least a portion of the lock-on layer is created, or after the entire lock-on layer is created, or after the entire lock-on layer and a portion of the build layer(s) are created, or after the entire lock-on layer and the entire build layer(s) are created, supplemental radiation may be created and directed towards the deflection member to further cure at least one of at least a portion of the lock-on layer and/or at least a portion of the build layer(s). The supplemental radiation may be created by at least one radiation source 130 described above, or may be created by at least one supplemental radiation source (not shown). The at least one supplemental radiation source may be located on the same side of the reinforcing member as the at least one radiation source, or may be located on the opposite side of the reinforcing member of the at least one radiation source, or in some embodiments on both sides.

Figure 8:
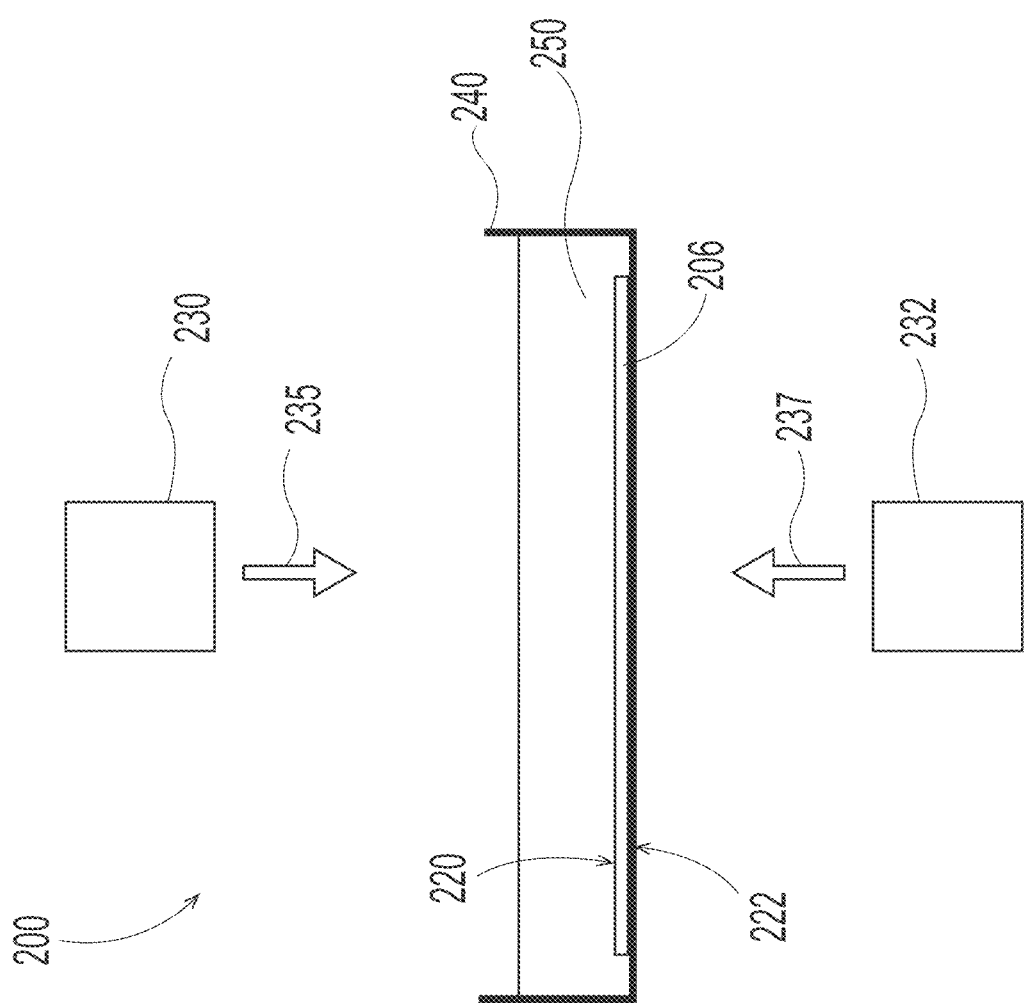
FIG. 8 is a schematic representation of system set up to employ in the additive methods as detailed herein.

Second Method:

In another method for manufacturing a deflection member depicted in FIG. 8, an additive manufacturing apparatus 200 is provided that includes at least one upper radiation source 230 and at least one lower radiation source 232 and a vat 240 containing photopolymer resin 250. A reinforcing member 206 is provided that has an upper surface 220 and a lower surface 222 opposite the upper surface. Reinforcing member 206 is submerged in photopolymer resin 250 contained in vat 240, such that lower surface 222 is in contact with the bottom of the vat. In this exemplary embodiment, the utilized reinforcing member may be translucent so that radiation may pass through the reinforcing member, but it may also be opaque.

Radiation 237 may then be created by at least one lower radiation source 232 and directed from the at least one lower radiation source towards lower surface 222 of reinforcing member 206 such that the radiation at least partially cures photopolymer resin in contact with lower surface 222 of the reinforcing member to create at least a portion of a lock-on layer (not shown). In some embodiments, radiation 237 is enough to create the entire lock-on layer. In some embodiments, radiation 237 from at least one lower radiation source 232 can be repeated to create the entire lock-on layer. The term "lock-on layer" is used to describe the layer of at least partially cured photopolymer resin that surrounds the reinforcing member. Lock-on layer may include the at least partially cured resin that surrounds upper surface 220, lower surface 222, the sidewall surfaces 42 of any foramina 40 (as detailed in FIG. 5), the side surfaces 30 of any voids 18 of reinforcing member 206 (as detailed in FIGS. 1-4), and or any other surface of the reinforcing member, such as the outers sides of the overall member. In some methods, radiation 237 from at least one lower radiation source 232 may create a lock-on layer that includes at least partially cured resin that contacts at least one of the upper surface 220, lower surface 222, the sidewall surfaces 42 of any foramina 40 (as detailed in FIG. 5), the side surfaces 30 of any voids 18 of reinforcing member 206 (as detailed in FIGS. 1-4), and or any other surface of the reinforcing member, such as the outers sides of the overall member. Accordingly, radiation 237 from at least one lower radiation source 232 may create the entire lock-on layer. In other methods, the portion of the lock-on layer described above may be combined with one or more of the portions of the lock-on layer described below to form the complete lock-on layer.

After (or during) the first portion of the lock-on layer is at least partially cured, in the embodiment illustrated in FIG. 8, reinforcing member 206 can be raised to the top of the vat containing photopolymer resin 250 so that the upper surface 220 is just below the upper surface of the photopolymer resin. Reinforcing member 206 movement can be carried out through utilization of a build plate (not shown) or a tensioned reinforcing member (i.e., between rollers not shown) moving by manual or computer control, or any other way known in the art of additive manufacturing. In alternate embodiments of FIG. 8, the upper surface of the photopolymer resin can be moved relative to the upper surface of the reinforcing member by adding an additional volume of resin and optionally may accelerate leveling and bubble removal by mechanical (e.g. wiping, not shown) or thermal (e.g. pre-heating or heating the resin) means or combinations thereof.

Radiation 235 may be optionally created by at least one upper radiation source 230 and directed from the at least one upper radiation source towards upper surface 220 of reinforcing member 206 such that the radiation at least partially cures photopolymer resin in contact with the upper surface of the reinforcing member to create at least a portion of a lock-on layer (not shown). In some embodiments, this portion of the lock-on layer in addition to the previously described portion of the lock-on layer (cured photopolymer resin in contact with lower surface 222 of reinforcing member 206) will make up the entire lock-on layer. In some embodiments, radiation 235 from at least one upper radiation source 230 can be repeated to create the entire lock-on layer.

In embodiments wherein reinforcing member 206 includes voids 18, radiation 235 and/or 237 may also be created by at least one radiation source 230,232 and directed from the at least one radiation source towards upper surface 220 and/or lower surface 222 of the reinforcing member such that the radiation at least partially cures photopolymer resin in contact with at least one side surface 30 of at least some of the voids to create at least a portion of the lock-on layer (not shown). In some embodiments, this portion of the lock-on layer in addition to at least one of the previously described portion(s) of the lock-on layer (cured photopolymer resin in contact with the upper and/or lower surfaces of the reinforcing member) will make up the entire lock-on layer. In some embodiments where reinforcing member 206 includes voids 18, radiation 235 and/or 237 may be repeated simultaneously or alternating to create at least a portion of the lock-on layer or make-up the entire lock-on layer.

In embodiments wherein reinforcing member 306 includes foramina 40, radiation 335 and/or 337 may also be created by at least one radiation source 330,332 and directed from the at least one radiation source towards upper surface 320 and/or lower surface 322 of the reinforcing member such that the radiation at least partially cures photopolymer resin in contact with at least one sidewall 42 of at least some of the foramina to create at least a portion of the lock-on layer (not shown). In some embodiments, this portion of the lock-on layer in addition to at least one of the previously described portion(s) of the lock-on layer (cured photopolymer resin in contact with the upper and/or lower surfaces of the reinforcing member) will make up the entire lock-on layer. In some embodiments where reinforcing member 206 includes foramina 40, radiation 235 and/or 237 may be repeated simultaneously or alternating to create at least a portion of the lock-on layer or make-up the entire lock-on layer.

After the lock-on layer is created through one or more of the steps described above, radiation 235 may be created by at least one upper radiation source 230 and directed towards upper surface 220 of reinforcing member 206 to at least partially cure photopolymer in contact with the lock-on layer to create one or more build layer(s) (not shown). The term "build layer" is used to describe the layer(s) of at least partially cured photopolymer resin that is/are created upon of the lock-on layer. In some embodiments, radiation 235 may be repeated with at least one upper radiation source 230 to create at least a portion of the build-up layer or make-up the entire build-up layer. An exemplary embodiment is that a portion of the lock-on layer and build layer can be created about simultaneously or the entire lock-on layer and build layer can be created about simultaneously. The term "build layer" is used to describe the layer(s) of at least partially cured photopolymer resin that is/are created upon the lock-on layer. The lock-on layer can be backed away from the top of the vat 222, allowing photopolymer resin to flow between the lock-on layer and the top of the vat. In alternate embodiments of FIG. 8, the upper surface of the photopolymer resin can be moved relative to the upper surface of the reinforcing member by adding an additional volume of resin and optionally may accelerate leveling and bubble removal by mechanical (e.g. wiping, not shown) or thermal (e.g. pre-heating or heating the resin) means or combinations thereof.

The build layers stack on top of each other and create a structure that will resemble the resinous framework of traditional deflection members. As described above, the build layers created by additive manufacturing in the methods detailed herein that form the resinous framework equivalent of traditional deflection members may be in any shape, style or structure now known, or known in the future. The number of build layers that build on top of one another (with the bottom build layer contacting the lock-on layer) may be between 1 and about 500, or may be between 1 and about 300, or may be between 1 and about 200, or may be between 1 and about 150, or may be between 1 and about 100, or may be between 1 and about 75, or may be between 1 and about 50, or may be between 1 and about 25, or between 1 and about 50,000. When creating the build layer(s), the reinforcing member/lock-on layer is moved further from radiation source 230 with creation of each successive build layer. Alternatively, the radiation source may be moved further away from the reinforcing member/lock-on layer may with creation of each successive build layer. This reinforcing layer/lock-on layer movement can be carried out through utilization of a build plate (not shown) moving by manual or computer control, or any other way known in the art of additive manufacturing. Further, in embodiments where the radiation source moves or is reflected, the radiation source movement or reflection, or combinations thereof, may be carried out through utilization of any means known in the art. Individual build layer thickness may represent incremental distance on the order of microns—examples include, but are not limited to, 1000, 100, 10, 1 and/or 0.1 microns.

While creating the lock-on layer and/or build layer(s), reinforcing member 106 may be tensioned to control warp while curing. Tension may occur in both planar and non-planar configurations. The build layers may be registered with the previous layer. Other shapes may be created by practicing one or more layers in an unregistered fashion relative to the previous layer. Registration is defined as positioning an X-Y region along a Z axis that is common to all layers within a shape—an example would be stacking layers to create a symmetrical shape. Other methods of stacking may require positioning that is off-center for a given X-Y region but registered with the previous layer to preserve continuity in one or more side walls. Lastly, it is possible that registered stacking is substantially symmetrical rather than perfectly symmetrical.

After the at least a portion of the lock-on layer is created, or after the entire lock-on layer is created, or after the entire lock-on layer and a portion of the build layer(s) are created, or after the entire lock-on layer and the entire build layer(s) are created, supplemental radiation may be created and directed towards the deflection member to further cure at least one of at least a portion of the lock-on layer and/or at least a portion of the build layer(s). The supplemental radiation may be created by at least one radiation source 130 described above, or may be created by at least one supplemental radiation source (not shown). The at least one supplemental radiation source may be located on the same side of the reinforcing member as the at least one radiation source, or may be located on the opposite side of the reinforcing member of the at least one radiation source, or in some embodiments on both sides.

Figure 9:
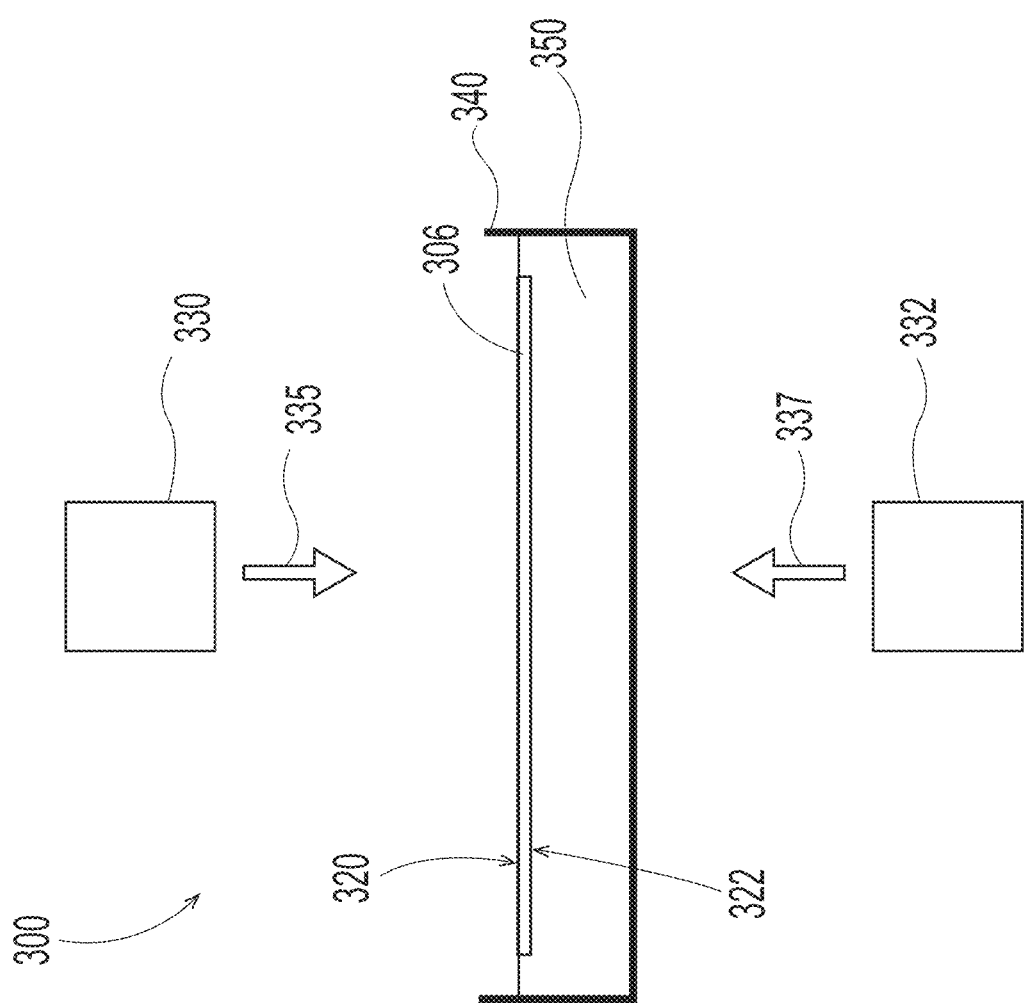
FIG. 9 is a schematic representation of system set up to employ in the additive methods as detailed herein.

Third Method:

In another method for manufacturing a deflection member depicted in FIG. 9, an additive manufacturing apparatus 300 is provided that includes at least one upper radiation source 330 and at least one lower radiation source 332 and a vat 340 containing photopolymer resin 350. A reinforcing member 306 is provided that has an upper surface 320 and a lower surface 322 opposite the upper surface. Reinforcing member 306 is submerged in photopolymer resin 350 contained in vat 340, such that the upper surface 320 is just below the upper surface of the photopolymer resin. In this exemplary embodiment, the utilized reinforcing member may be wholly or partially translucent so that radiation may pass through the reinforcing member, but it may also be opaque.

Radiation 335 may then be created by at least one upper radiation source 330 and directed from the at least one upper radiation source towards upper surface 320 of reinforcing member 306 such that the radiation at least partially cures photopolymer resin in contact with upper surface 320 of the reinforcing member to create at least a portion of a lock-on layer (not shown). In some embodiments, radiation 335 is enough to create the entire lock-on layer. In some embodiments, radiation 335 from at least one upper radiation source 330 can be repeated to create the entire lock-on layer. The term "lock-on layer" is used to describe the layer of at least partially cured photopolymer resin that surrounds the reinforcing member. Lock-on layer may include the at least partially cured resin that surrounds upper surface 320, lower surface 322, the sidewall surfaces 42 of any foramina 40 (as detailed in FIG. 5), the side surfaces 30 of any voids 18 of reinforcing member 206 (as detailed in FIGS. 1-4), and or any other surface of the reinforcing member, such as the outers sides of the overall member. In some methods, radiation 335 from at least one upper radiation source 330 may create a lock-on layer that includes at least partially cured resin that contacts at least one of the upper surface 320, lower surface 322, the sidewall surfaces 42 of any foramina 40 (as detailed in FIG. 5), the side surfaces 30 of any voids 18 of reinforcing member 306 (as detailed in FIGS. 1-4), and or any other surface of the reinforcing member, such as the outers sides of the overall member. Accordingly, radiation 335 from at least one upper radiation source 330 may create the entire lock-on layer. In other methods, the portion of the lock-on layer described above may be combined with one or more of the portions of the lock-on layer described below to form the complete lock-on layer.

After (or during) the first portion of the lock-on layer is at least partially cured, in the embodiment illustrated in FIG. 9, reinforcing member 306 can be lowered to the bottom of vat 340 containing photopolymer resin 350 so that the lower surface 322 is in contact with the bottom of the vat. Reinforcing member 306 movement can be carried out through utilization of a build plate (not shown) or a tensioned reinforcing member (i.e., between rollers not shown), moving by manual or computer control, or any other way known in the art of additive manufacturing.

Radiation 337 may be optionally created by at least one lower radiation source 332 and directed from the at least one lower radiation source towards lower surface 322 of reinforcing member 306 such that the radiation at least partially cures photopolymer resin in contact with the lower surface of the reinforcing member to create at least a portion of a lock-on layer (not shown). In some embodiments, this portion of the lock-on layer in addition to the previously described portion of the lock-on layer (cured photopolymer resin in contact with upper surface 320 of reinforcing member 306) will make up the entire lock-on layer. In some embodiments, radiation 337 from at least one lower radiation source 332 can be repeated to create the entire lock-on layer.

In embodiments wherein reinforcing member 306 includes voids 18, radiation 335 and/or 337 may also be created by at least one radiation source 330,332 and directed from the at least one radiation source towards upper surface 320 and/or lower surface 322 of the reinforcing member such that the radiation at least partially cures photopolymer resin in contact with at least one side surface 30 of at least some of the voids to create at least a portion of the lock-on layer (not shown). In some embodiments, this portion of the lock-on layer in addition to at least one of the previously described portion(s) of the lock-on layer (cured photopolymer resin in contact with the upper and/or lower surfaces of the reinforcing member) will make up the entire lock-on layer. In some embodiments where reinforcing member 306 includes voids 18, radiation 335 and/or 337 may be repeated simultaneously or alternating to create at least a portion of the lock-on layer or make-up the entire lock-on layer.

In embodiments wherein reinforcing member 306 includes foramina 40, radiation 335 and/or 337 may also be created by at least one radiation source 330,332 and directed from the at least one radiation source towards upper surface 320 and/or lower surface 322 of the reinforcing member such that the radiation at least partially cures photopolymer resin in contact with at least one sidewall 42 of at least some of the foramina to create at least a portion of the lock-on layer (not shown). In some embodiments, this portion of the lock-on layer in addition to at least one of the previously described portion(s) of the lock-on layer (cured photopolymer resin in contact with the upper and/or lower surfaces of the reinforcing member) will make up the entire lock-on layer. In some embodiments where reinforcing member 306 includes foramina 40, radiation 335 and/or 337 may be repeated simultaneously or alternating to create at least a portion of the lock-on layer or make-up the entire lock-on layer.

After the lock-on layer is created through one or more of the steps described above, radiation 337 may be created by at least one lower radiation source 332 and directed towards lower surface 322 of reinforcing member 306 to at least partially cure photopolymer in contact with the lock-on layer to create a build layer (not shown). The term "build layer" is used to describe the layer(s) of at least partially cured photopolymer resin that is/are created upon of the lock-on layer. In some embodiments, radiation 337 may be repeated with at least one lower radiation source 332 to create at least a portion of the build-up layer or make-up the entire build-up layer. An exemplary embodiment is that a portion of the lock-on layer and build layer can be created about simultaneously or the entire lock-on layer and build layer can be created about simultaneously. The term "build layer" is used to describe the layer(s) of at least partially cured photopolymer resin that is/are created upon the lock-on layer. The lock-on layer can be backed away from the bottom of the vat, allowing photopolymer resin to flow between the lock-on layer and the bottom of the vat. In alternate embodiments of FIG. 9, the lower surface of the photopolymer resin can be moved relative to the upper surface of the reinforcing member by moving of the entire vat, or the bottom portion of the vat.

The build layers stack on top of each other and create a structure that will resemble the resinous framework of traditional deflection members. As described above, the build layers created by additive manufacturing in the methods detailed herein that form the resinous framework equivalent of traditional deflection members may be in any shape, style or structure now known, or known in the future. The number of build layers that build on top of one another (with the bottom build layer contacting the lock-on layer) may be between 1 and about 500, or may be between 1 and about 300, or may be between 1 and about 200, or may be between 1 and about 150, or may be between 1 and about 100, or may be between 1 and about 75, or may be between 1 and about 50, or may be between 1 and about 25, or may be between 1 and about 50,000. When creating the build layer(s), the reinforcing member/lock-on layer is moved further from radiation source 332 with creation of each successive build layer. Alternatively, the radiation source may be moved further away from the reinforcing member/lock-on layer may with creation of each successive build layer. This reinforcing layer/lock-on layer movement can be carried out through utilization of a build plate (not shown) moving by manual or computer control, or any other way known in the art of additive manufacturing. Further, in embodiments where the radiation source moves or is reflected, the radiation source movement or reflection, or combination thereof, may be carried out through utilization of any means known in the art. Individual build layer thickness may represent incremental distance on the order of microns—examples include, but are not limited to, 1000, 100, 10, 1 and/or 0.1 microns.

While creating the lock-on layer and/or build layer(s), reinforcing member 106 may be tensioned to control warp while curing. Tension may occur in both planar and non-planar configurations. The build layers may be registered with the previous layer. Other shapes may be created by practicing one or more layers in an unregistered fashion relative to the previous layer. Registration is defined as positioning an X-Y region along a Z axis that is common to all layers within a shape—an example would be stacking layers to create a symmetrical shape. Other methods of stacking may require positioning that is off-center for a given X-Y region but registered with the previous layer to preserve continuity in one or more side walls. Lastly, it is possible that registered stacking is substantially symmetrical rather than perfectly symmetrical.

After the at least a portion of the lock-on layer is created, or after the entire lock-on layer is created, or after the entire lock-on layer and a portion of the build layer(s) are created, or after the entire lock-on layer and the entire build layer(s) are created, supplemental radiation may be created and directed towards the deflection member to further cure at least one of at least a portion of the lock-on layer and/or at least a portion of the build layer(s). The supplemental radiation may be created by at least one radiation source 130 described above, or may be created by at least one supplemental radiation source (not shown). The at least one supplemental radiation source may be located on the same side of the reinforcing member as the at least one radiation source, or may be located on the opposite side of the reinforcing member of the at least one radiation source, or in some embodiments on both sides.

Examples of Processes for a Making Deflection Member

Most 3D printing equipment (e.g., an SLA apparatus) have options for slicing a three dimensional object in to slices or layers. The slices or layers can typically be any desired thickness up to about 200 microns, or up to about 300 microns, with some non-limiting thicknesses being 10 microns, 25 microns, 50 microns and 100 microns. Recently released from Formlabs, the new Form 3/3L increases the maximum thickness per layer to 300 microns. All slices or layers do not need to be the same thickness, as layer thickness can vary in the printing of a single object. However, the max layer thickness that 3D printing equipment can typically build is less than a normal reinforcing member thickness. Accordingly, the operation of the equipment expects a Z distance equivalent to the layer thickness, and thus methods have been developed to work with a physically constraining reinforcing member present within the object being printed.

Example 1

A Form 2 SLA (laser) printer from Formlabs, Inc.® was modified to enable inclusion of a reinforcing member in the build process. A reinforcing member was constructed using 100% combed cotton needle point canvas (12 mesh and about 540 micron thick). The X-Y strands of the reinforcing member were white and opaque in appearance. The resin vat was loaded with Formlabs Flexible V2 resin which is gray in color. A hoop was additively manufactured using an Objet 30 Prime PolyJet 3D printer—where the hoop enabled tension to be applied in both the MD and CD direction holding the reinforcing member against an upper build platform made of brushed aluminum. A continuous cross-hatch pattern was constructed in Solidworks (3D CAD) and exported as an STL file. The STL file was sliced into layers using PreForm; and PreForm launched the build. The reinforcing member-modified platform was submerged to the bottom of the resin vat and a single laser was driven by galvo mirrors to cure resin for the lock-on layer and subsequent build layers. Between such layers, the reinforcing member-modified build platform was separated from the bottom of the vat, raised, and incrementally repositioned above the previous layer position. During this repositioning, a mechanical wiper removed debris and redistributed resin across the build area. The laser was positioned beneath the vat and transmitted the radiation through the transparent vat.

Example 2

Figure 11:
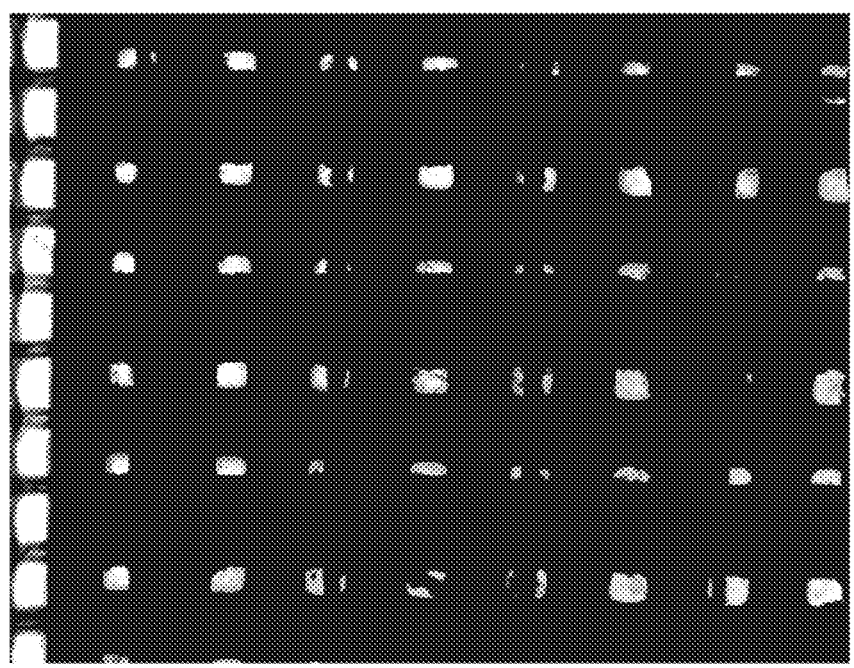
FIG. 11 is a photograph of a deflection member produced by the methods detailed herein.
Figure 12:
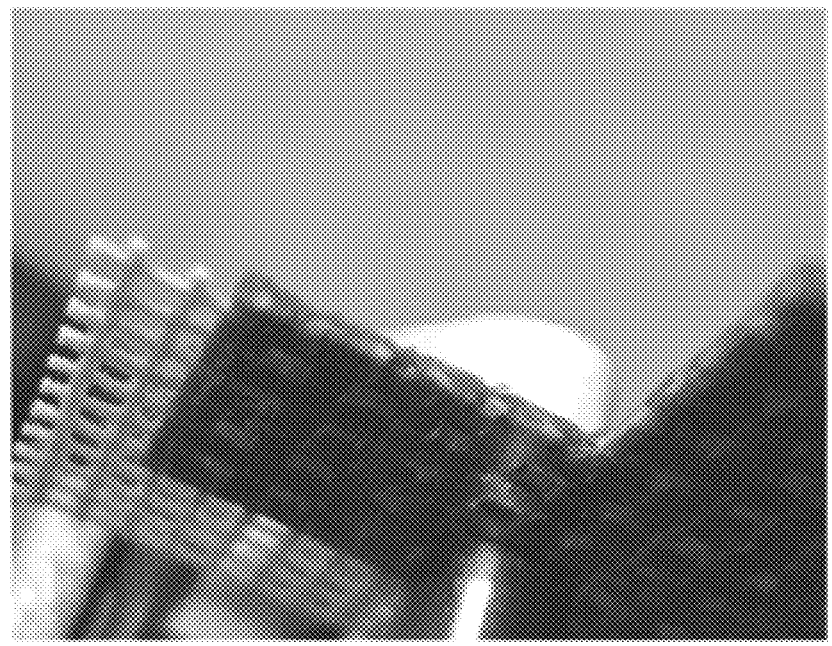
FIG. 12 is a photograph of a cross-section of the deflection member FIG. 11.
Figure 13:
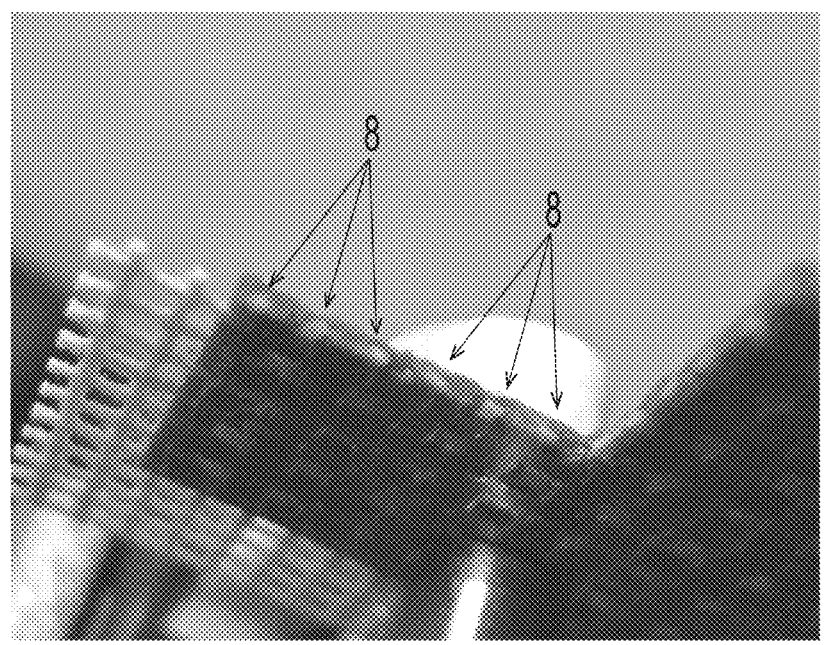
FIG. 13 is a photograph of a cross-section of the deflection member FIG. 11 with arrows to indicate the filaments 8 of the reinforcing member.

In another example similar to Example 1, the build platform was modified to include the reinforcing member at the $7^{th}$ layer in the build sequence of 14×50 micron thick layers. Operation was paused to insert the reinforcing member and hoop on to and around the build platform. A portion of the result is shown in FIGS. 11, 12 and 13, such that the pattern is locked on to the reinforcing member by partially surrounding the strands.

Example 3

In another example similar to Example 2, the build platform was modified to include a reinforcing member at the 14$^{th}$ layer in the build sequence of 28×50 micron thick layers. Operation was paused to insert the reinforcing member and hoop on to and around the build platform. This resulted in a 3D pattern wholly locked onto the reinforcing member.

Example 4

Using a Form 1+ SLA from Formlabs in a bottom up configuration (laser also beneath the vat), a reinforcing member was affixed to the build platform via black Gorilla tape. The tape was pressed against a PPS-reinforcing member and wrapped around the edges of the build platform. A second layer of tape was added to increase the depth of resin between the first surface of the reinforcing member and the inner bottom surface of the vat. The distance was about 0.81 mm. Improved resolution was achieved by covering the reflective aluminum build platform with red 3M tape or flat black Formica prior to printing. Black Formica is preferred due to slight solubility of the red component of the 3M tape into the resin. An improved build platform is achieved when the radiation is absorbed on the build platform surface. Repetitive passes of energy were exposed to essentially the same thick pool of resin while the SLA printer executed a build. Build layers were not created by successive layers of uncured resin but rather successive exposures of energy according to the 3D CAD model. A pumping action of resin into the fixed space and movement of the reinforcing member can cause the reinforcing member to shift and reduce the number of exposures locally within the resin.

Example 5

To account for undesired resin and reinforcing member displacement, a Form 1+ SLA was inverted to enable the laser to radiate a stationary vat of resin beneath the laser (similar to the upper laser in FIG. 8), and the build plate was removed. Since the vat was stationary, the reinforcing member in the vat was also stationary. The vat was constructed from a square petri dish and was transparent to the radiation. Successive pattern exposures of the laser cured the fixed resin volume in the desired pattern with both regions equivalent to lock-on and build layers. The thickness of each build layer was determined by the height of the photopolymer resin in the vat.

Example 6

In another example similar to Example 5, to facilitate removal from the vat (petri dish), a transparent barrier film was used on the bottom of the vat. This kept the vat clean from uncured resin.

Example 7

In another example similar to Example 6, to increase the thickness of the overall build layer region or to alter the shape of the cured resin pattern, additional resin is added to increase the fixed resin volume after the first set of exposures. The steps can be repeated to achieve the final thickness or shape.

Example 8

In another example similar to Example 7, to improve the final layer, a barrier film can be added which limits further diffusion of atmospheric oxygen into the resin and enables depletion of the dissolved oxygen in free radial photopolymerization. The barrier film can be smooth creating a planar surface on the top of protuberances or resinous framework. Optionally, the film can be textured to impart a textured surface to the resinous framework consistent with U.S. Pat. No. 9,909,258 issued Mar. 6, 2018 in the name of Seger et al.

Example 9

A MakeBlock LaserBot Engraving Kit (part RB-Mab-240 from RobotShop Inc, Swanton, Vt.) was modified to point up rather than down and include a 405 nm (450-500 mW) laser, to orient a Form1+ vat above the laser plane and operate similar to FIG. 7. The laser was controlled in the XY coordinate direction to create the letters TEST as a pattern using a transparent photopolymer. Besides galvo and mirror controlled lasers (as in Example 5), this demonstrated the potential to use a laser mounted on an XY gantry motion controlled table.

Example 10

Using configurations as shown in FIGS. 6 and 7, and combining techniques from Examples 5-8, Peopoly Moth SLA (models Moai 130 and Moai 200) were modified to operate without the moving build plate in FIG. 6 and the laser was inverted similar to FIG. 7. These used a fixed volume of resin with repeated radiation exposures up to 26 times at about 59% to 69% laser power to demonstrate simultaneous lock-on layer creation and build layer creation. This demonstrated capability for XY galvo mirror control only rather than Formlabs Form 1+ which has galvo mirror control and a 45 degree reflecting mirror.

Fibrous Structure:

One purpose of the 3-D printed deflection member (produced as detailed herein) is to provide a forming surface on which to mold fibrous structures such as paper products including paper towels, toilet tissue, and facial tissue, as well as mold nonwovens including diaper, adult incontinence and feminine care topsheet materials, and the like. When used in a papermaking process, the deflection member can be utilized in the "wet end" of a papermaking process, as described in more detail below, in which fibers from a fibrous slurry are deposited on the web side surface of the deflection member. Similarly, the deflection member can be used to catch and mold fibers in a nonwoven making process.

Thus, as can be understood from the description herein, a fibrous structure can be shaped to the general shape of the deflection member such that the shape and size of the 3-D features of the fibrous structure are a close approximation of the size and shape of the 3-D objects printed on the resinous framework of the deflection member.

Figure 10:
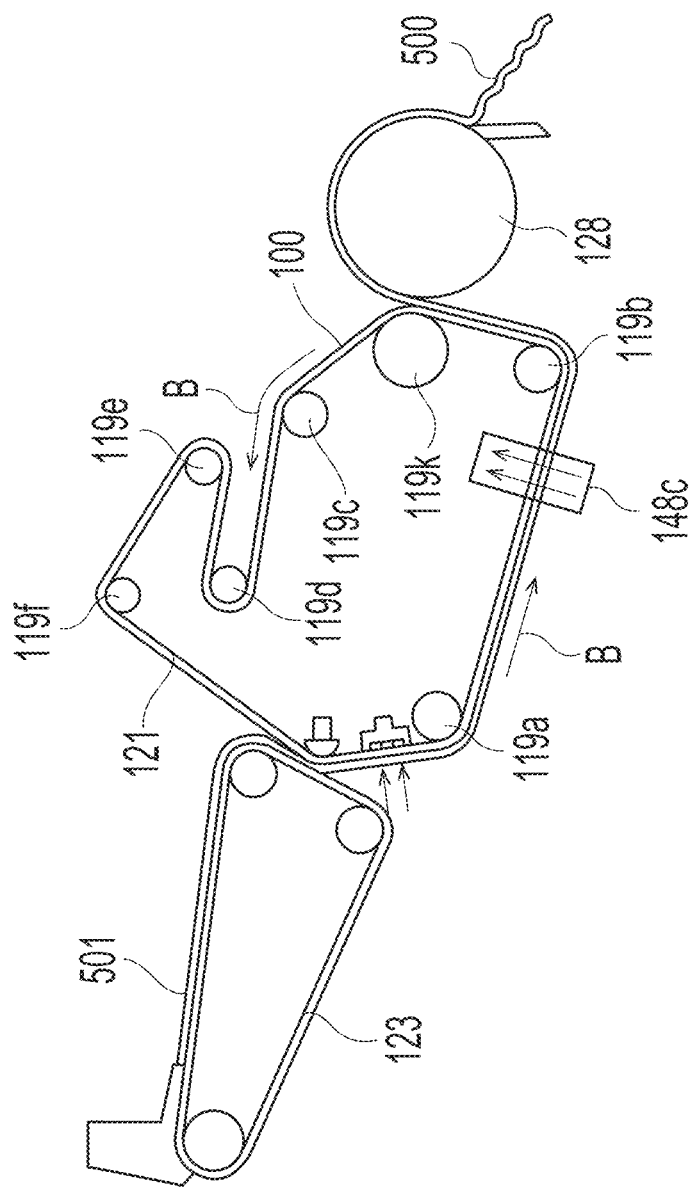
FIG. 10 is a schematic representation of a papermaking process.

Processes for Making Fibrous Structure:

In one form, deflection members as disclosed herein may be used in a papermaking process. With reference to FIG. 10, one exemplary form of a process for producing a paper web 500 comprises the following steps. First, a plurality of fibers 501 are provided and deposited on a forming wire 123 of a papermaking machine, as is known in the art.

The present disclosure contemplates the use of a variety of fibers, such as, for example, cellulosic fibers, synthetic fibers, or any other suitable fibers, and any combination thereof. Papermaking fibers useful in the present disclosure include cellulosic fibers commonly known as wood pulp fibers. Fibers derived from soft woods (gymnosperms or coniferous trees) and hard woods (angiosperms or deciduous trees) are contemplated for use in this disclosure. The particular species of tree from which the fibers are derived is immaterial. The hardwood and softwood fibers can be blended, or alternatively, can be deposited in layers to provide a stratified web. U.S. Pat. No. 4,300,981 issued Nov. 17, 1981 in the name of Carstens; and U.S. Pat. No. 3,994,771 issued Nov. 30, 1976 in the name of Morgan et al. are incorporated herein by reference for the purpose of disclosing layering of hardwood and softwood fibers.

The wood pulp fibers can be produced from the native wood by any convenient pulping process. Chemical processes such as sulfite, sulfate (including the Kraft) and soda processes are suitable. Mechanical processes such as thermomechanical (or Asplund) processes are also suitable. In addition, various semi-chemical and chemi-mechanical processes can be used. Bleached as well as unbleached fibers are contemplated for use. When the fibrous web of this invention is intended for use in absorbent products such as paper towels, bleached northern softwood Kraft pulp fibers may be used. Wood pulps useful herein include chemical pulps such as Kraft, sulfite and sulfate pulps as well as mechanical pulps including for example, ground wood, thermomechanical pulps and Chemi-ThermoMechanical Pulp (CTMP). Pulps derived from both deciduous and coniferous trees can be used.

In addition to the various wood pulp fibers, other cellulosic fibers such as cotton linters, rayon, and bagasse can be used in this invention. Synthetic fibers, such as polymeric fibers, can also be used. Elastomeric polymers, polypropylene, polyethylene, polyester, polyolefin and nylon can be used. The polymeric fibers can be produced by spunbond processes, meltblown processes and/or other suitable methods known in the art.

The paper furnish can comprise a variety of additives, including but not limited to fiber binder materials, such as wet strength binder materials, dry strength binder materials, chemical softening compositions, latexes, bicomponent fibers with a soften-able or melt-able outer shell, and thermoplastic fibers. Suitable wet strength binders include, but are not limited to, materials such as polyamide-epichlorohydrin resins sold under the trade name of KYMENE™ 557H by Hercules Inc., Wilmington, Del. Suitable temporary wet strength binders include but are not limited to synthetic polyacrylates. A suitable temporary wet strength binder is PAREZ™ 750 marketed by American Cyanamid of Stanford, Conn. Suitable dry strength binders include materials such as carboxymethyl cellulose and cationic polymers such as ACCO™ 711. The CYPRO/ACCO family of dry strength materials are available from CYTEC of Kalamazoo, Mich. Forms of fiber bonding may also be utilized, including, but not limited to, carding and hydroentangling.

The paper furnish can comprise a debonding agent to inhibit formation of some fiber to fiber bonds as the web is dried. The debonding agent, in combination with the energy provided to the web by the dry creping process, results in a portion of the web being debulked. In one form, the debonding agent can be applied to fibers forming an intermediate fiber layer positioned between two or more layers. The intermediate layer acts as a debonding layer between outer layers of fibers. The creping energy can therefore debulk a portion of the web along the debonding layer. Suitable debonding agents include chemical softening compositions such as those disclosed in U.S. Pat. No. 5,279,767 issued Jan. 18, 1994 in the name of Phan et al., the disclosure of which is incorporated herein by reference. Suitable biodegradable chemical softening compositions are disclosed in U.S. Pat. No. 5,312,522 issued May 17, 1994 in the name of Phan et al.; U.S. Pat. Nos. 5,279,767 and 5,312,522, the disclosures of which are incorporated herein by reference. Such chemical softening compositions can be used as debonding agents for inhibiting fiber to fiber bonding in one or more layers of the fibers making up the web. One suitable softener for providing debonding of fibers in one or more layers of fibers forming the web is a papermaking additive comprising DiEster Di (Touch Hardened) Tallow Dimethyl Ammonium Chloride. A suitable softener is ADOGEN® brand papermaking additive available from Witco Company of Greenwich, Conn.

The embryonic web can be typically prepared from an aqueous dispersion of papermaking fibers, though dispersions in liquids other than water can be used. The fibers are dispersed in the carrier liquid to have a consistency of from about 0.1 to about 0.3 percent. Alternatively, and without being limited by theory, it is believed that the present disclosure is applicable to moist forming operations where the fibers are dispersed in a carrier liquid to have a consistency less than about 50 percent.

Conventional papermaking fibers can be employed, and the aqueous dispersion can be formed in conventional ways. Conventional papermaking equipment and processes can be used to form the embryonic web on the Fourdrinier wire. The association of the embryonic web with the deflection member can be accomplished by simple transfer of the web between two moving endless belts as assisted by differential fluid pressure. The fibers may be deflected into the deflection member by the application of differential fluid pressure induced by an applied vacuum. Any technique, such as the use of a Yankee drum dryer or through air dryers, can be used to dry the intermediate web. Foreshortening can be accomplished by any conventional technique such as creping or rush transfer.

The plurality of fibers can also be supplied in the form of a moistened fibrous web (not shown), which should preferably be in a condition in which portions of the web could be effectively deflected into the deflection conduits of the deflection member and the void spaces formed between the suspended portions and the X-Y plane.

As depicted in FIG. 10, embryonic web comprising fibers 501 is transferred from forming wire 123 to belt 121 on which the deflection member, produced as detailed herein, can be disposed. Alternatively, or additionally, a plurality of fibers or fibrous slurry, can be deposited onto the deflection member directly from a headbox or otherwise, including in a batch process (not shown). Papermaking belt 100 comprising the deflection member held between the embryonic web and belt 121 can travel past optional dryers/vacuum devices and about rolls 119a, 119b, 119k, 119c, 119d, 119e, and 119f in the direction schematically indicated by the directional arrow "B".

A portion of fibers 501 can be deflected onto the deflection member such as to cause some of the deflected fibers to be disposed within any voids printed in the 3-D printed resinous member of the deflection member. Depending on the process, mechanical and fluid pressure differential, alone or in combination, can be utilized to deflect a portion of fibers 501 into any voids of the deflection member. For example, in a through-air drying process, vacuum apparatus 148c can apply a fluid pressure differential to the embryonic web disposed on the deflection member, thereby deflecting fibers into the deflection conduits of the deflection member. The process of deflection may be continued with additional vacuum pressure, if necessary, to even further deflect the fibers into any voids present on the deflection member.

Finally, a partly-formed fibrous structure associated with the deflection member can be separated from the deflection member at roll 119k at the transfer to Yankee dryer 128. By doing so, the deflection member having the fibers thereon, is pressed against a pressing surface, such as, for example, a surface of Yankee drying drum 128. After being creped off the Yankee dryer, fibrous structure 500 results and can be further processed or converted as desired.

In another form, the deflection members as disclosed herein may be used in a nonwoven making process to capture/mold fibers in the creation of a nonwoven web, the type of which is commonly used as a top sheet and/or outercover nonwoven in diapers, adult incontinence products and feminine care products. Such processes use forced air and/or vacuum to draw fibers down into the deflection member, and are further detailed in commonly assigned U.S. patent application Ser. No. 15/879,480, filed Jan. 25, 2018 in the name of Ashraf et al.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application is hereby incorporated herein by reference in its entirety unless expressly excluded or otherwise limited. The citation of any document is not an admission that it is prior art with respect to any example disclosed or claimed herein or that it alone, or in any combination with any other reference or references, teaches, suggests or discloses any such example. Further, to the extent that any meaning or definition of a term in this document conflicts with any meaning or definition of the same term in a document incorporated by reference, the meaning or definition assigned to that term in this document shall govern.

While particular examples of the present disclosure have been illustrated and described, it would be obvious to those skilled in the art that various other changes and modifications can be made without departing from the spirit and scope of the present disclosure. It is therefore intended to cover in the appended Claims all such changes and modifications that are within the scope of this disclosure.

What is claimed is:

1. A method for manufacturing a deflection member, the method comprising the steps of:
    a.) providing an additive manufacturing apparatus that comprises at least one radiation source and a vat containing a photopolymer resin;
    b.) providing a reinforcing member having a first surface and a second surface opposite the first surface;
    c.) contacting at least the second surface of the reinforcing member with the photopolymer resin; and
    d.) directing radiation from the at least one radiation source towards the first surface of the reinforcing member such that the radiation passes through the first surface of the reinforcing member to at least partially cure photopolymer resin in contact with the second surface of the reinforcing member to create at least a portion of a lock-on layer.

2. The method of claim 1, wherein the additive manufacturing apparatus is an SLA apparatus or a CLIP apparatus.

3. The method of claim 1, further comprising the steps of submerging the reinforcing member into the photopolymer resin and directing radiation from the at least one radiation source to at least partially cure photopolymer in contact with the first surface of the reinforcing member to create at least a portion of the lock-on layer.

4. The method of claim 3, further comprising a step of directing radiation from the at least one radiation source to at least partially cure photopolymer in contact with the lock-on layer to create a build layer.

5. The method of claim 4, further comprising the step of directing supplemental radiation to further cure at least one of the lock-on layer and the build layer.

6. The method of claim 1, wherein the reinforcing member comprises foramina, the foramina each having at least one sidewall surface located between the first surface and the second surface of the reinforcing member.

7. The method of claim 6, further comprising the steps of contacting the sidewall surfaces of at least some of the foramina with the photopolymer resin and directing radiation from the at least one radiation source to cure photopolymer resin in contact with the sidewall surfaces of at least some of the foramina to create at least a portion of the lock-on layer.

8. The method of claim 1, wherein the reinforcing member comprises woven filaments and voids between the woven filaments, each void having at least four side surfaces located between the first surface and the second surface of the reinforcing member.

9. The method of claim 8, further comprising the steps of contacting at least one of the side surfaces of at least some of the voids with the photopolymer resin and directing radiation from the at least one radiation source to cure photopolymer resin in contact with the at least one side surface to create at least a portion of the lock-on layer.

* * * * *